(12) United States Patent
Dicke

(10) Patent No.: US 9,354,068 B2
(45) Date of Patent: May 31, 2016

(54) SYSTEM AND METHOD FOR DYNAMICALLY DOWNLOADING AND DISPLAYING MAP DATA

(75) Inventor: Ronald Anthony Dicke, Ottawa (CA)

(73) Assignee: BlackBerry Limited, Waterloo, CA (US)

( * ) Notice: Subject to any disclaimer, the term of this patent is extended or adjusted under 35 U.S.C. 154(b) by 1553 days.

(21) Appl. No.: 12/013,906

(22) Filed: Jan. 14, 2008

(65) Prior Publication Data

US 2009/0182500 A1 Jul. 16, 2009

(51) Int. Cl.
*G01C 21/00* (2006.01)
*G01C 21/32* (2006.01)

(52) U.S. Cl.
CPC ............... *G01C 21/32* (2013.01); *G01C 21/00* (2013.01)

(58) Field of Classification Search
CPC .............. B60W 10/184; B60W 10/20; B60W 2050/009; B60W 2720/14; B60W 30/09
USPC ............... 701/1, 2, 22, 36, 41, 70, 79, 83, 96, 701/110, 115, 121, 29.1, 29.2, 29.7–34.4
See application file for complete search history.

(56) References Cited

U.S. PATENT DOCUMENTS

| | | | |
|---|---|---|---|
| 6,324,467 | B1 | 11/2001 | Machii |
| 6,553,308 | B1 | 4/2003 | Uhlmann et al. |
| 2001/0007088 | A1 | 7/2001 | Winter et al. |
| 2007/0229311 | A1* | 10/2007 | Bowman et al. ......... 340/995.14 |

FOREIGN PATENT DOCUMENTS

| | | |
|---|---|---|
| EP | 1 635 144 A | 3/2006 |
| EP | 1 643 214 A | 4/2006 |
| EP | 1 840 516 A | 10/2007 |
| WO | 2006/013122 A | 2/2006 |

OTHER PUBLICATIONS

European Search Report for EP Application No. 08150232.0 mailed Jul. 23, 2008.

* cited by examiner

*Primary Examiner* — Helal A Algahaim
*Assistant Examiner* — Charles J Han
(74) *Attorney, Agent, or Firm* — Moffat & Co.

(57) ABSTRACT

Dynamically downloading map data to a wireless communications device is achieved by determining a map data density for an area of interest and then dynamically downloading and optionally also dynamically displaying the map data for the area of interest based on the map data density. For areas of interest with low map data density, this technology has the effect of downloading more map data so that the map is displayed with more detail than would conventionally be obtained. Conversely, for areas of interest with excessively high map data density, dynamic downloading and display can reduce the onscreen map density for a less crowded map.

24 Claims, 13 Drawing Sheets

FIG. 7A

Map Index — 700

| Layer Name | Zoom In | Zoom Out |
|---|---|---|
| Parks A | 0 | 4 |
| Parks B | 5 | 8 |
| Parks C | 9 | 11 |
| Parks D | 12 | 13 |
| Landmarks | 0 | 11 |
| Bodies of Water A | 0 | 4 |
| Bodies of Water B | 5 | 8 |
| Bodies of Water C | 9 | 11 |
| Bodies of Water D | 12 | 15 |
| Labels A | 0 | 4 |
| Labels B | 5 | 8 |
| Labels C | 9 | 11 |
| Labels D | 12 | 15 |
| Railroads A | 0 | 4 |
| Railroads B | 5 | 5 |
| Major Highways A | 0 | 3 |
| Major Highways B | 4 | 8 |
| Main Streets A | 0 | 3 |
| Main Streets B | 4 | 6 |
| Side Streets A | 0 | 3 |

\# of Layers = 20

SYSTEM AND METHOD FOR DYNAMICALLY DOWNLOADING AND DISPLAYING MAP DATA

CROSS-REFERENCE TO RELATED APPLICATIONS

This is the first application filed for the present technology.

TECHNICAL FIELD

The present disclosure relates generally to wireless communications devices and, in particular, to techniques for downloading and displaying maps on wireless communications devices.

BACKGROUND

Wireless communications devices such as the BlackBerry® by Research in Motion Limited provide a variety of useful functions, such as voice communication, e-mail and Web browsing. Of growing popularity are mapping applications that take advantage of the device's wireless link and Web capabilities to download and render maps on the device. When coupled with a GPS receiver, either embedded as a GPS chipset or externally (e.g. Bluetooth™ connected), these mapping applications can be used for navigation and other location-based services (LBS). Depending on the map server, maps can be downloaded in vector format or bitmap format. While all map data required to fully render detailed maps onscreen can be easily downloaded to desktop computers with broadband connections, the same is not true when downloading maps to a wireless communications device (because of the limited bandwidth of the wireless link). Another consideration is the limited onboard processing capability of the wireless communications device which limits the use of computationally intensive labelling algorithms on the client device. These, and other considerations, are to be kept in mind when improving and refining mapping technologies for wireless communications devices.

BRIEF DESCRIPTION OF THE DRAWINGS

Further features and advantages of the present technology will become apparent from the following detailed description, taken in combination with the appended drawings, in which:

FIG. 7A schematically depicts an example of a map index having offsets used for determining map data density for an area of interest;

It will be noted that throughout the appended drawings, like features are identified by like reference numerals.

DETAILED DESCRIPTION

Figure 1:
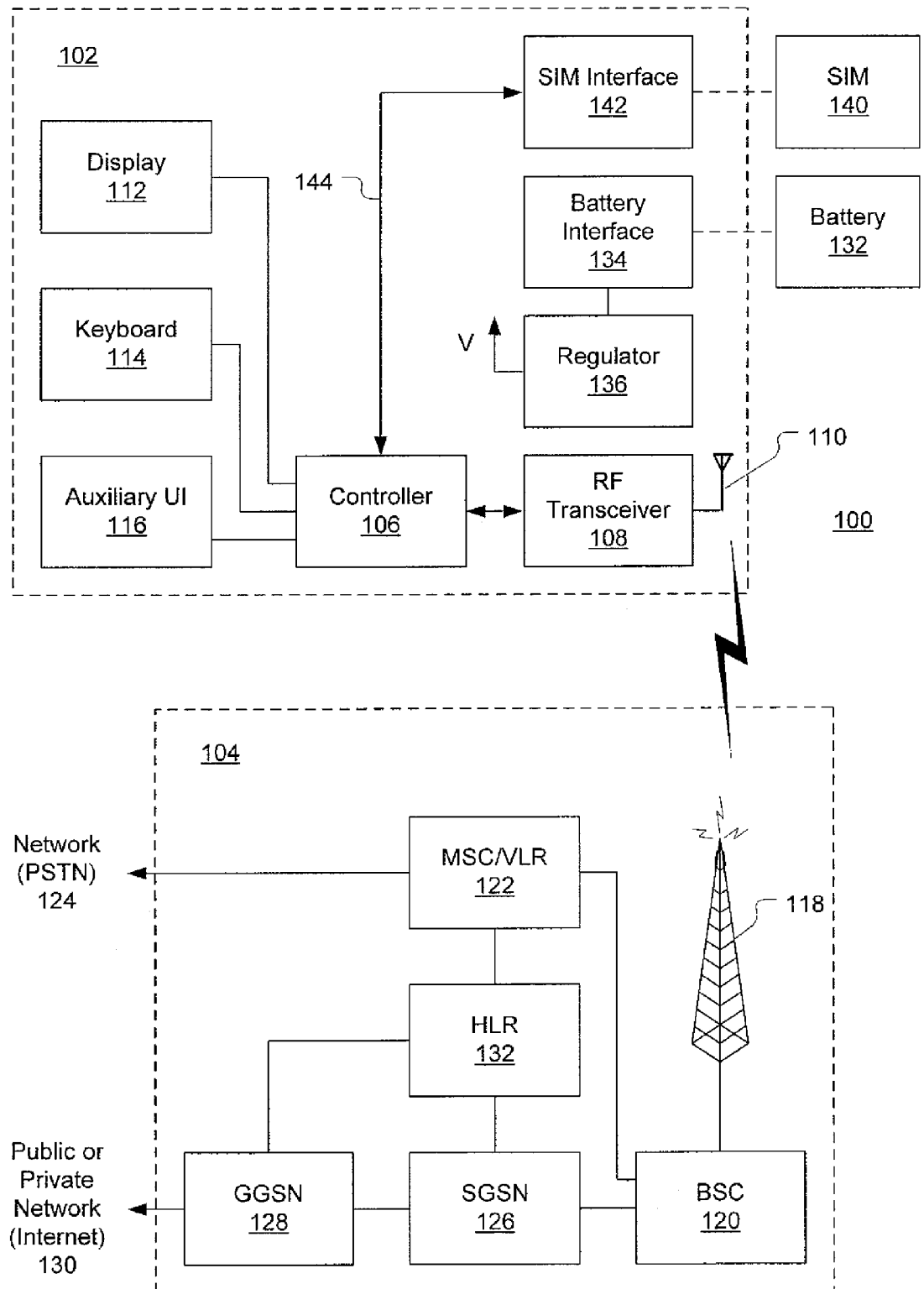
FIG. 1 is a block diagram schematically illustrating pertinent components of an exemplary wireless communications device and of an exemplary wireless communications network on which the present technology can be implemented.

The present technology addresses a technical problem identified by the applicant pertaining to the manner in which maps are currently downloaded and displayed on wireless communications devices. For example, for maps in vector format, when downloading map data at a specific zoom level, a determination must be made as to which layers of map data are to be retrieved. This determination is typically based on predefined criteria or thresholds for the selected zoom level so as to avoid crowding too much detail on the map (particularly on the small screen of the wireless device). So for example, at a low zoom level, all the streets are typically retrieved, but at higher zoom levels typically all the side streets are not retrieved because it would be too crowded to display on the screen and the total amount of data to be downloaded would be too large. This is illustrated by way of example in FIGS. 6A-6H.

However, the amount of data, and the screen crowding, is very much a function of map density. So, for example, what may be too crowded for a large city such as Madrid or New York might be fine for a smaller city such as Ottawa or for a small town or a rural area. Not only is the data size small enough to download all the streets at the particular zoom level for a rural area, but it may be particularly desirable to do so since it would add significant value to the map. Referring to the rural area shown by way of example in FIGS. 6A-6H, the side roads are shown at Zoom Level 3 but disappear at the next zoom level (Zoom Level 4). In addition to the loss of the side roads, the lakes disappear at Zoom Level 5 and beyond. The maps at Zoom Levels 5 and 6 are so devoid of any detail that they have little or no value to the end-user. The unnecessary (and undesirable) loss of this map detail is a result of a static and uniform application of preset thresholds across all map data irrespective whether it is urban, suburban or rural. In other words, the map application predetermines that certain layers of map data at certain zoom levels are not to be retrieved so as to avoid crowding maps of places like Madrid, and many others like it, where side roads are too dense to display at zoom levels higher than Zoom Level 3. As well, small bodies of water which contain many points since they are not simple polygons are prohibitive to display and retrieve at higher zoom levels when the data is already dense (as it is in Madrid).

However, it is clear from FIGS. 6A-6H that the side roads and lakes in the rural area could easily be downloaded and displayed at higher zoom levels and that this would be, in fact, highly desirable so as to add essential geographical context to the map.

The present technology addresses the foregoing technical problems by providing a method, computer program product, and wireless communications device that dynamically download map data based on the map data density for a given area of interest. This solves the problem that for different areas, urban versus rural, for example, different amounts of map data exist for a given zoom level. By computing or estimating the map data density for a given area of interest, map data can be dynamically downloaded to provide more detailed maps in rural areas without overcrowding maps in urban areas. Dynamic downloading therefore corrects the problem of rigidly ("statically") applying fixed criteria/thresholds to all areas of interest irrespective whether they are urban or rural. Optionally, where the device has knowledge of its velocity, e.g. from a GPS receiver, the download of map data can be dynamically adjusted based on the velocity so that, for example, less data is downloaded or critical layers are downloaded first. As another optional feature, the downloading can be dynamically adjusted as a function of signal strength. In other words, if the signal strength of the radio link is weak such that the amount of data that can be downloaded is substantially less than normal, then the device can dynamically adjust which map data (which layers) and how much of the data is to be downloaded based on the density of map data in the area of interest.

Thus, an aspect of the present technology is a method of dynamically downloading map data to a wireless communications device, where the method includes steps of determining a map data density for an area of interest, and dynamically downloading the map data for the area of interest based on the map data density.

Another aspect of the present technology is a computer program product comprising code adapted to perform the steps of the foregoing method when the computer program product is loaded into memory and executed on a processor of a wireless communications device.

Yet another aspect of the present technology is a wireless communications device having a radiofrequency transceiver for requesting and receiving map data corresponding to an area of interest, a processor operatively coupled to memory for determining a map data density based on the map data for the area of interest and for dynamically downloading map data based on the map data density for the area of interest, and a display for displaying a map based on the map data downloaded for the area of interest.

The details and particulars of these aspects of the technology will now be described below, by way of example, with reference to the attached drawings.

FIG. 1 is a block diagram of a communication system 100 which includes a wireless communications device 102 (also referred to as a mobile communications device or wireless handheld) which communicates through a wireless communications network 104. For the purposes of the present specification, the expression "wireless communications device" encompasses not only a wireless handheld, cell phone or wireless-enabled laptop but also any mobile communications device or portable communications device such as a satellite phone, wireless-enabled PDA, wireless-enabled MP3 player, or wireless-enabled portable GPS navigation unit. In other words, for the purposes of this specification, "wireless" shall be understood as encompassing not only standard cellular or microwave RF technologies, but also any other communications technique that conveys data over the air using an electromagnetic signal.

The wireless communications device 102 preferably includes a visual display 112, e.g. an LCD screen, a keyboard 114 (or keypad), and optionally one or more auxiliary user interfaces (UI) 116, each of which is coupled to a controller 106. The controller 106 is also coupled to radio frequency (RF) transceiver circuitry 108 and an antenna 110. Typically, controller 106 is embodied as a central processing unit (CPU) which runs operating system software in a memory device (described later with reference to FIG. 2). Controller 106 normally controls the overall operation of the wireless communications device 102, whereas signal processing operations associated with communications functions are typically performed in the RF transceiver circuitry 108. Controller 106 interfaces with the display screen 112 to display received information, stored information, user inputs, and the like. Keyboard/keypad 114, which may be a telephone-type keypad or a full QWERTY keyboard, is normally provided for entering commands and data.

The wireless communications device 102 sends communication signals to and receives communication signals from network 104 over a wireless link via antenna 110. RF transceiver circuitry 108 performs functions similar to those of station 118 and Base Station Controller (BSC) 120, including, for example, modulation and demodulation, encoding and decoding, and encryption and decryption. It will be apparent to those skilled in the art that the RF transceiver circuitry 108 will be adapted to the particular wireless network or networks in which the wireless communications device is intended to operate.

The wireless communications device 102 includes a battery interface 134 for receiving one or more rechargeable batteries 132. Battery 132 provides electrical power to electrical circuitry in the device 102, and battery interface 134 provides for a mechanical and electrical connection for battery 132. Battery interface 134 is couple to a regulator 136 which regulates power to the device. When the wireless device 102 is fully operationally, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Wireless communications device 102 operates using a Subscriber Identity Module (SIM) 140 which is connected to or inserted in the wireless communications device 102 at a SIM interface 142. SIM 140 is one type of a conventional "smart card" used to identify an end user (or subscriber) of wireless device 102 and to personalize the device, among other things. Without SIM 140, the wireless communications device 102 is not fully operational for communication through wireless network 104. By inserting the SIM card 140 into the wireless communications device 102, an end user can have access to any and all of his subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical wireless device. SIM 140 may store additional user information for the wireless device as well, including datebook (calendar) information and recent call information.

The wireless communications device 102 may consist of a single unit, such as a data communication device, a cellular telephone, a Global Positioning System (GPS) unit or other positioning subsystem, a multiple-function communication device with data and voice communication capabilities, a wireless-enabled personal digital assistant (PDA), or a wireless-enabled laptop computer. Alternatively, the wireless communications device 102 may be a multiple-module unit comprising a plurality of separate components, including but in no way limited to a computer or other device connected to a wireless modem. In particular, for example, in the block diagram of FIG. 1, RF circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU.

The wireless communications device 102 communicates in and through a wireless communication network 104. The wireless communication network may be a cellular telecommunications network. In the example presented in FIG. 1, wireless network 104 is configured in accordance with Global Systems for Mobile communications (USM) and General Packet Radio Service (GPRS) technologies. Although wireless communication network 104 is described herein as a GSM/GPRS-type network, any suitable network technologies may be utilized such as Code Division Multiple Access (CDMA), Wideband CDMA (WCDMA), whether 2G, 3G, or Universal Mobile Telecommunication System (UMTS) based technologies. In this example, the GSM/GPRS wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is, in turn, coupled to a public or private data network 130 (such as the Internet). HLR 132 is coupled to MSC 122, SGSN 126 and GGSN 128.

Tower station 118 is a fixed transceiver station. Tower station 118 and BSC 120 may be referred to as transceiver equipment. The transceiver equipment provides wireless network coverage for a particular coverage area commonly referred to as a "cell". The transceiver equipment transmits communication signals to and receives communication signals from wireless communications devices 102 within its cell via station 118. The transceiver equipment normally performs such functions as modulation and possibly encoding and/or encryption of signals to be transmitted to the wireless communications device in accordance with particular, usually predetermined, communication protocols and parameters. The transceiver equipment similar demodulates and possibly decodes and decrypts, if necessary, any communication signals received from the wireless communications device 102 transmitting within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and wireless communications device 102. An RF channel is a limited resource that must be conserved, typically due limits in overall bandwidth and a limited battery power of the wireless device 102. Those skilled in the art will appreciate that a wireless network in actual practice may include hundreds of cells, each served by a station 118, depending upon desired overall expanse of network coverage. All pertinent components may be connected by multiple switches and routers (not shown), controlled by multiple network controllers.

For all wireless communications devices 102 registered with a network operator, permanent data (such as the user profile associated with each device) as well as temporary data (such as the current location of the device) are stored in the HLR 132. In case of a voice call to the wireless device 102, the HLR 132 is queried to determine the current location of the device 102. A Visitor Location Register (VLR) of MSC 122 is responsible for a group of location areas and stores the data of those wireless devices that are currently in its area of responsibility. This includes parts of the permanent data that have been transmitted from HLR 132 to the VLR for faster access. However, the VLR of MSC 122 may also assign and store local data, such as temporary identifications. Optionally, the VLR of MSC 122 can be enhanced for more efficient coordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of wireless devices 102. SGSN 126 also performs security functions and access control. Gateway GPRS Support Node (GGSN) 128 provides internetworking with external packet-switched networks and is connected with SGSNs (such as SGSN 126) via an IP-based GPRS backbone network SGSN 126 performs authentication and cipher setting procedures based on the same algorithms, keys, and criteria as in existing GSM. In conventional operation, cell selection may be performed autonomously by wireless device 102 or by the transceiver equipment instructing the wireless device to select a particular cell. The wireless device 102 informs wireless network 104 when it reselects another cell or group of cells, known as a routing area.

In order to access GPRS services, the wireless device 102 first makes its presence known to wireless network 104 by performing what is known as a GPRS "attach". This operation establishes a logical link between the wireless device 102 and SGSN 126 and makes the wireless device 102 available to receive, for example, pages via SGSN, notifications of incoming GPRS data, or SMS messages over GPRS. In order to send and receive GPRS data, the wireless device 102 assists in activating the packet data address that it wants to use. This operation makes the wireless device 102 known to GGSN 128; internetworking with external data networks can thereafter commence. User data may be transferred transparently between the wireless device 102 and the external data networks using, for example, encapsulation and tunneling. Data packets are equipped with GPRS-specific protocol information and transferred between wireless device 102 and GGSN 128.

Those skilled in the art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
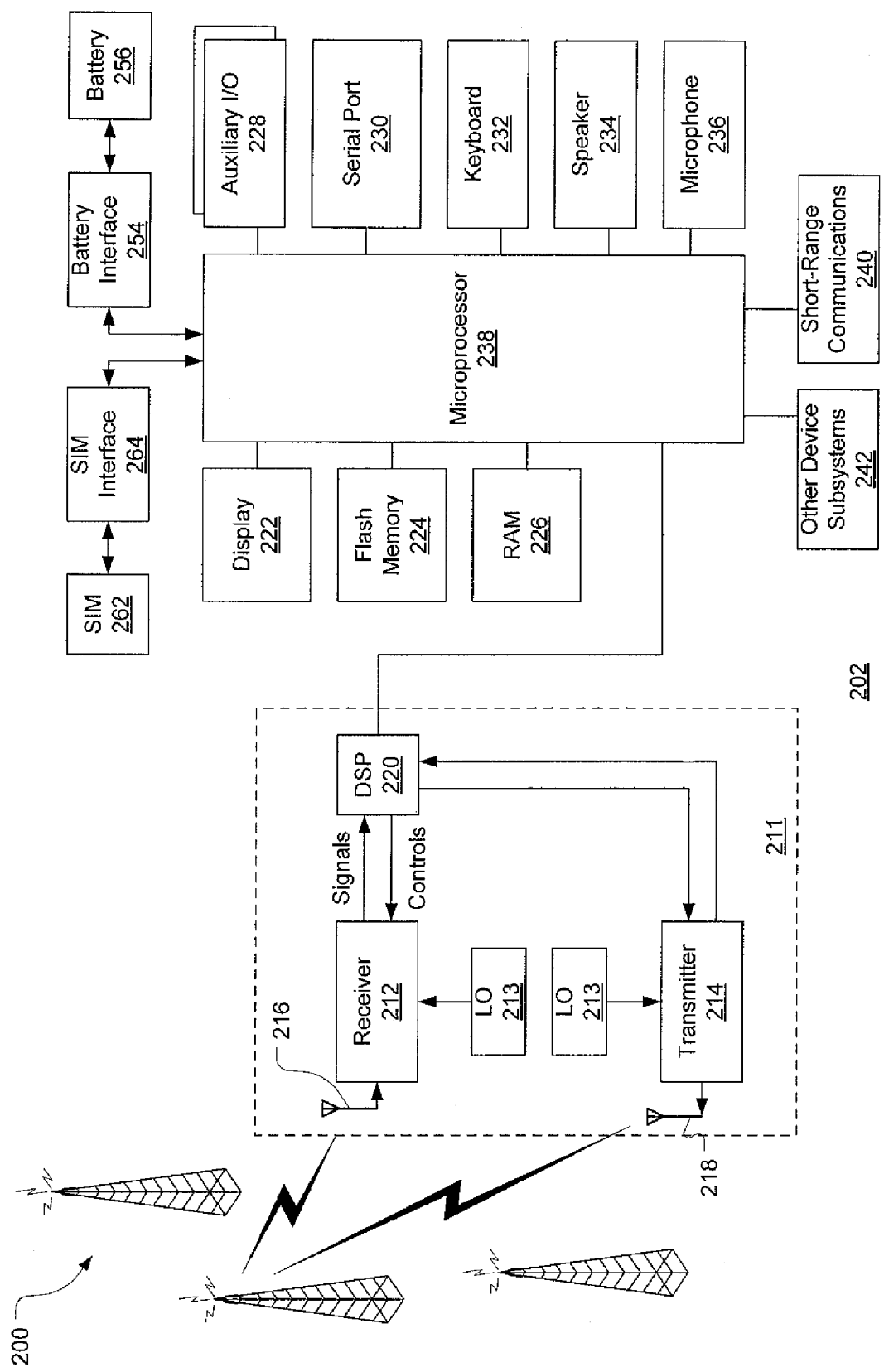
FIG. 2 is a more detailed block diagram of a wireless communications device presented solely as an example of one device on which the present technology can be implemented.

FIG. 2 is a detailed block diagram of a preferred wireless communications device 202. The wireless device 202 is preferably a two-way communication device having at least voice and advanced data communication capabilities, including the capability to communicate with other computer systems. Depending on the functionality provided by the wireless device 202, it may be referred to as a data messaging device, a two-way pager, a cellular telephone with data message capabilities, a wireless Internet appliance, or a data communications device (with or without telephony capabilities). The wireless device 202 may communicate with any one of a plurality of fixed transceiver stations 200 within its geographic coverage area.

The wireless communications device 202 will normally incorporate a communication subsystem 211, which includes a receiver 212, a transmitter 214, and associated components, such as one or more (preferably embedded or internal) antenna elements 216 and 218, local oscillators (LO's) 213, and a processing module such as a digital signal processor (DSP) 220. Communication subsystem 211 is analogous to RF transceiver circuitry 108 and antenna 110 shown in FIG. 1. As will be apparent to those skilled in the field of communications, the particular design of communication subsystem 211 depends on the communication network in which the wireless device 202 is intended to operate.

The wireless device 202 may send and receive communication signals over the network after required network registration or activation procedures have been completed. Signals received by antenna 216 through the network are input to receiver 212, which may perform common receiver functions as signal amplification, frequency down conversion, filtering, channel selection, and the like, and, as shown in the example of FIG. 2, analog-to-digital (A/D) conversion. A/D conversion of a received signal allows more complex communication functions such as demodulation and decoding to performed in the DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in the DSP 220.

Network access is associated with a subscriber or user of the wireless device 202, and therefore the wireless device requires a Subscriber Identity Module or SIM card 262 to be inserted in a SIM interface 264 in order to operate in the network. SIM 262 includes those features described in relation to FIG. 1. Wireless device 202 is a battery-powered device so it also includes a battery interface 254 for receiving one or more rechargeable batteries 256. Such a battery 256 provides electrical power to most if not all electrical circuitry in the device 102, and battery interface provides for a mechanical and electrical connection for it. The battery interface 254 is coupled to a regulator (not shown) which provides a regulated voltage V to all of the circuitry.

Wireless communications device 202 includes a microprocessor 238 (which is one implementation of controller 106 of FIG. 1) which controls overall operation of wireless device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or onboard functions. Notably, some subsystems, such as keyboard 232 and display 222, for example, may be used for both communication-related functions, such as entering a text message for transmission over a communication network, and device-resident functions such as a calculator or task list Operating system software used by the microprocessor 238 is preferably stored in a persistent (non-volatile) store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on the wireless device 202. A predetermined set of applications which control basic device operations, including at least data and voice communication applications, will normally be installed on the device 202 during its manufacture. For example, the device may be pre-loaded with a personal information manager (PIM) having the ability to organize and manage data items relating to the user's profile, such as e-mail, calendar events, voice mails, appointments, and task items. Naturally, one or more memory stores are available on the device 202 and SIM 256 to facilitate storage of PIM data items and other information.

The PIM application preferably has the ability to send and receive data items via the wireless network. PIM data items may be seamlessly integrated, synchronized, and updated via the wireless network, with the wireless device user's corresponding data items stored and/or associated with a host computer system thereby creating a mirrored host computer on the wireless device 202 with respect to such items. This is especially advantageous where the host computer system is the wireless device user's office computer system. Additional applications may also be loaded into the memory store(s) of the wireless communications device 202 through the wireless network, the auxiliary I/O subsystem 228, the serial port 230, short-range communications subsystem 240, or any other suitable subsystem 242, and installed by a user in RAM 226 or preferably a non-volatile store (not shown) for execution by the microprocessor 238. Such flexibility in application installation increases the functionality of the wireless device 202 and may provide enhanced onboard functions, communication-related functions or both. For example, secure communication applications may enable electronic commerce functions and other such financial transactions to be performed using the wireless device 202.

In a data communication mode, a received signal such as a text message, an e-mail message, or a web page download will be processed by communication subsystem 211 and input to microprocessor 238. Microprocessor 238 will preferably further process the signal for output to display 222 or alternatively to auxiliary I/O device 228. A user of the wireless device 202 may also compose data items, such as email messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of the wireless communications device 202 is substantially similar, except that the received signals would be output to speaker 234 and signals for transmission would be generated by microphone 236. Alternative voice or audio I/O subsystems, such as a voice message recording subsystem, may also be implemented on the wireless device 202. Although voice or audio signal output is preferably accomplished primarily through speaker 234, display 222 may also be used to provide an indication of the identity of the calling party, duration on a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of wireless device 202 by providing for information or software downloads to the wireless device 202 other than through the wireless network. The alternate download path may, for example, be used to load an encryption key onto the wireless device 202 through a direct and thus reliable and trusted connection to thereby provide secure device communications.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a trademark of Bluetooth SIG, Inc.

Figure 3A:
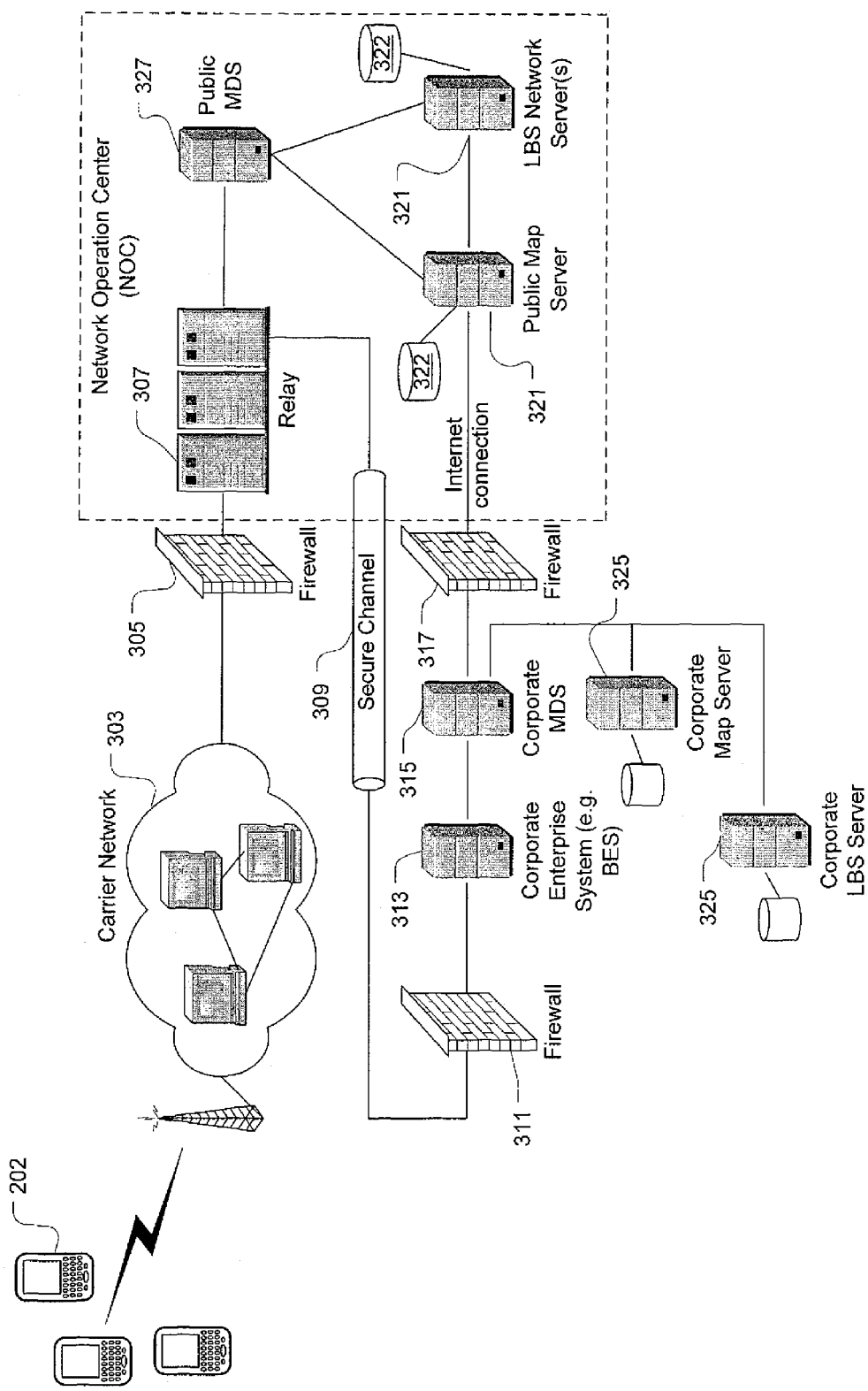
FIG. 3A is a system diagram of exemplary network components which provide mapping functionality in the wireless communications devices of FIG. 1 and FIG. 2.

FIG. 3A is a system diagram of network components which provide mapping functionality in the wireless communication devices of FIGS. 1 and 2. To achieve this, a mapping application is also provided in memory of the wireless communications device for rendering visual maps in its display. Wireless communications devices 202 are connected over a mobile carrier network 303 for communication through a firewall 305 to a relay 307. A request for map data from any one of the wireless communications devices 202 is received at relay 307 and passed via a secure channel 309 through firewall 311 to a corporate enterprise server 313 and corporate mobile data system (MDS) server 315. The request is then passed via firewall 317 to a public map server and/or to a public location-based service (LBS) server 321 which provides location-based services (LBS) to handle the request. The network may include a plurality of such map servers and/or LBS servers where requests are distributed and processed through a load distributing server. The map/LBS data may be stored on this network server 321 in a network database 322, or may be stored on a separate map server and/or LBS server (not shown). Private corporate data stored on corporate map/LBS server 325 may be added to the public data via corporate MDS server 315 on the secure return path to the wireless device 202. Alternatively, where no corporate servers are provided, the request from the wireless device 202 may be passed via relay 307 to a public MDS server 327, which sends the request to the public map/LBS server 321 providing map data or other local-based service in response to the request. For greater clarity, it should be understood that the wireless devices can obtain map data from a "pure" map server offering no location-based services, from an LBS server offering location-based services in addition to map content, or from a combination of servers offering map content and LBS.

A Maplet data structure is provided that contains all of the graphic and labelled content associated with a geographic area (e.g. map features such as restaurants (point features), streets (line features) or lakes (polygon features)). Maplets are structured in Layers of Data Entries ("DEntries") identified by a "Layer ID" to enable data from different sources to be deployed to the device and meshed for proper rendering. Each DEntry is representative of one or more artefact or label (or a combination of both) and includes coordinate information (also referred to as a "bounding box" or "bounding area") to identify the area covered by the DEntry and a plurality of data points that together represent the artefact, feature or label. For example, a DEntry may be used to represent a street on a city map (or a plurality of streets), wherein the carious points within the DEntry are separated into different parts representing various portions of the artefact or map feature (e.g. portions of the street). A wireless device may issue a request for the map server to download only those DEntries that are included within a specified area or bounding box representing an area of interest that can be represented by, for example, a pair of bottom left, top right coordinates.

Figure 3B:
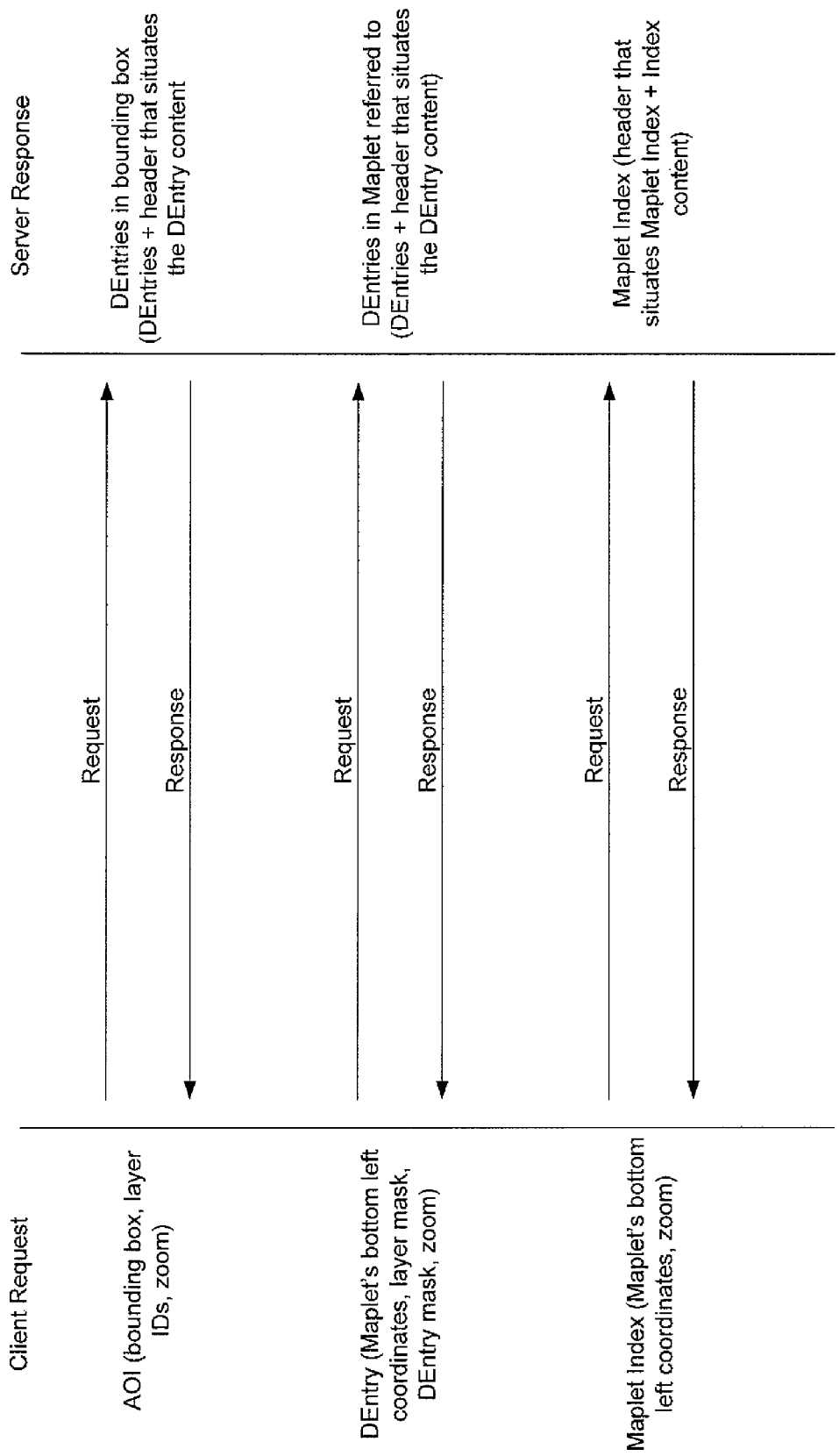
FIG. 3B illustrates an example message exchange between a wireless communications device and a map server for downloading map content to the wireless communications device based on the system of FIG. 3A.

As depicted in FIG. 3B, the wireless communications device issues one or more AOI (Area of Interest) requests, DEntry or data requests and Maplet Index requests to the map server for selective downloading of map data based on user context. Thus, rather than transmitting the entire map data for an area in reply to each request from the device (which burdens the wireless link), local caching may be used in conjunction with context filtering of map data on the server. For example, if a user's wireless device is GPS-enabled and the user is traveling in an automobile at 120 km/h along a freeway then context filtering can by employed to prevent downloading of map data relating to passing side streets. Or, if the user is traveling in an airplane at 30,000 feet, then context filtering can be employed to prevent downloading of map data for any streets whatsoever. Also, a user's context can be defined, for example, in terms of occupation, e.g. a user whose occupation is a transport truck driver can employ context filtering to prevent downloading of map data for side streets on which the user's truck is incapable of traveling, or a user whose occupation is to replenish supplied of soft drink dispensing machines can employ context filtering to download public map data showing the user's geographical area of responsibility with irrelevant features such as lakes and parks filtered out and private map data containing the location of soft drink dispensing machines superimposed on the public map data.

The Maplet Index request results in a Maplet Index (i.e. only a portion of the Maplet that provides a table of contents of the map data available within the Maplet rather than the entire Maplet) being downloaded from the map server to the device, thereby conserving OTA (Over-the-Air) bandwidth and device memory caching requirements. The Maplet Index conforms to the same data structure as a Maplet, but omits the data points. Consequently, the Maplet Index is small (e.g. 300-400 bytes) relative to the size of a fully populated Maplet or a conventional bit map, and includes DEntry bounding boxes and attributes (size, complexity, etc.) for all artifacts within the Maplet. As the field of view changes (e.g. for a location-aware device that displays a map while moving), the device (client) software assesses whether or not it needs to download additional data from the server. Thus, if the size attribute or complexity attribute of an artefact that has started to move into the field of view of the device (but is not yet being displayed) is not relevant to the viewer's current context, then the device can choose not to display that portion of the artifact. On the other hand, if the portion of the artefact is appropriate for display, then the device accesses its cache to determine whether the DEntries associated with that portion of the artefact have already been downloaded, in which case the cached content is displayed. Otherwise, the device issues a request for the map server to download all the of the DEntries associated with the artifact portion.

By organizing the Maplet data structure in Layers, it is possible to seamlessly combine and display information obtained from public and private databases. For example, it is possible for the device to display an office building at a certain address on a street (e.g. a $1^{st}$ z-order attribute from public database), adjacent a river (e.g. a $2^{nd}$ z-order attribute from public database), with a superimposed floor plane of the building to show individual offices (e.g. $11^{th}$ z-order attribute from a private database, accessible through a firewall).

Referring back to FIG. 5A, within the network having map server(s) and/or LBS server(s) 321 and databases) 322 accessible to it, all of the map data for the entire world is divided and stored as a grid according to various levels of resolution (zoom), as set forth below in Table A. Thus, a single A-level Maplet represents a 0.05×0.05 degree grid area; a single B-level Maplet represents a 0.5×0.5 degree grid area; a single C-level Maplet represents a 5×5 degree grid area; a single D-level Maplet represents a 50×50 degree grid area; and a single E level Maplet represents the entire world in a single Maplet. It is understood that Table A is only an example of a particular Maplet grid division; different grid divisions having finer or coarser granularity may, of courser, be substituted. A Maplet includes a set of layers, with each layer containing a set of DEntries, and each DEntry containing a set of data points.

TABLE A

| Level | Grid (degrees) | # of Maplets to cover the World | # of Maplets to cover North America | # of Maplets to cover Europe |
| --- | --- | --- | --- | --- |
| A | 0.05 × 0.05 | 25,920,000 | 356,000 | 100,000 |
| B | 0.5 × 0.5 | 259,200 | 6,500 | 1000 |
| C | 5 × 5 | 2,592 | 96 | 10 |
| D | 50 × 50 | 32 | 5 | 5 |
| E | World | 1 | 1 | 1 |

As mentioned above, three specific types of requests may be generated by a wireless communications device (i.e. the client)—AOI requests, DEntry requests and Maplet Index requests. The requests may be generated separately or in various combinations, as discussed in greater detail below. An AOI (area of interest) request calls for all DEntries in a given area (bounding box) for a predetermined or selected set of z-order Layers. The AOI request is usually generated when the device moves to a new area so as to fetch DEntries for display before the device client knows what is available in the Maplet. The Maplet Index has the exact same structure as a Maplet but does not contain complete DEntries (i.e. the data Points actually representing artifacts and labels are omitted). Thus, a Maplet Index defines what Layers and DEntries are available for a given Maplet. A data or DEntry request is a mechanism to bundle together all of the required Dentries for a given Maplet.

Typically, AOI and Maplet Index requests are paired together in the same message, although they need not be, while DEntry requests are generated most often. For example, when a wireless device moves into an area for which no information has been stored on the device client, the Maplet Index request returns a Maplet Index that indicates what data the client can specifically request from the server 321, while the AOI request returns any DEntries within the area of interest for the specified Layers (if they exist). In the example requests shown on FIG. 3B, the desired Maplet is identified within a DEntry request by specifying the bottom-left Maplet coordinate. In addition, the DEntry request may include a layer mask so that unwanted Layers are not downloaded, a DEntry mask so that unwanted data Points are not downloaded, and zoom values to specify a zoom level for the requested DEntry. Once the device client has received the requested Maplet Index, the client typically then issues multiple DEntry requests to ask for specific DEntries (since the client knows all of the specific DEntries that are available based on the Maplet Index).

In this particular implementation, a collection of 20×20 A-level Maplets (representing a 1×1 degree square) is compiled into a Maplet Block File (.mbl). An .mbl file contains a header which specifies the offset and length of each Maplet in the .mbl file. The same 20×20 collection of Maplet index data is compiled into a Maplet Index file (.mbx). The .mbl and .mbx file structures are set forth in Tables B and C, respectively.

TABLE B

| Address Offset | Offset | Length |
| --- | --- | --- |
| 0x000 | Maplet #0 Offset (4 bytes) | Maplet #0 Length (4 bytes) |
| 0x008 | Maplet #1 Offset | Maplet #1 Length |
| 0x010 | Maplet #2 Offset | Maplet #2 Length |
| ... | ... | ... |
| 0xC78 | Maplet #399 Offset | Maplet #399 Length |
| 0xC80 | | Beginning of Maplet #0 |
| 0xC80 + Size of Maplet #0 | | Beginning of Maplet #1 |
| 0xC80 + Size of Maplet #0 + #1 | | Beginning of Maplet #2 |
| ... | | ... |
| 0xC80 + Σ of Size of Maplets (#0:#398) | | Beginning of Maplet #399 |

In Table B, the offset of Maplet #0 is 0x0000_0000 since, in this particular example, the data structure is based on the assumption that the base address for the actual Maplet data is 0x0000_0C80. Therefore the absolute address for Maplet #0 data is: Maplet #0 Address=Base Address (0x0000_0C80)+ Maplet #0 Offset (0x0000_0000), and additional Maplet addresses are calculated as: Maplet #(n+1) Offset=Maplet #(n) Offset+Maplet #(n) Length. If a Maplet has no data or does not exist, the length parameter is set to zero (0x0000_0000).

TABLE C

| Address Offset | Offset (4 bytes) | Length (4 bytes) |
|---|---|---|
| 0x000 | Maplet Index #0 Offset | Maplet Index #0 Length |
| 0x008 | Maplet Index #1 Offset | Maplet Index #1 Length |
| 0x010 | Maplet Index #2 Offset | Maplet Index #2 Length |
| ... | ... | ... |
| 0xC78 | Maplet Index #399 Offset | Maplet Index #399 Length |
| 0xC80 | Beginning of Maplet Index #0 | |
| 0xC80 + Size of Maplet Index #0 | Beginning of Maplet Index #1 | |
| 0xC80 + Size of Maplet Index #0 + #1 | Beginning of Maplet Index #2 | |
| ... | ... | |
| 0xC80 + Σ of Size of Maplet Indices (#0:#399) | Beginning of Maplet Index #399 | |

In Table C, the offset of Maplet Index #0 is 0x0000_0000 since, according to an exemplary embodiment the data structure is based on the assumption that the base address for the actual Maplet index data is 0x000_0C80. Therefore, the absolute address for Maplet Index #0 data is: Maplet Index #0 Address=Base Address (0x0000_0C80)+Maplet Index #0 Offset (0x0000_0000), and additional Maplet index addresses are calculated as: Maplet Index #(n+1) Offset=Maplet Index #(n) Offset+Maplet Index #(n) Length. If a Maplet Index has no data or does not exist, the length parameter is set to zero (0x0000_0000).

Figure 3C:
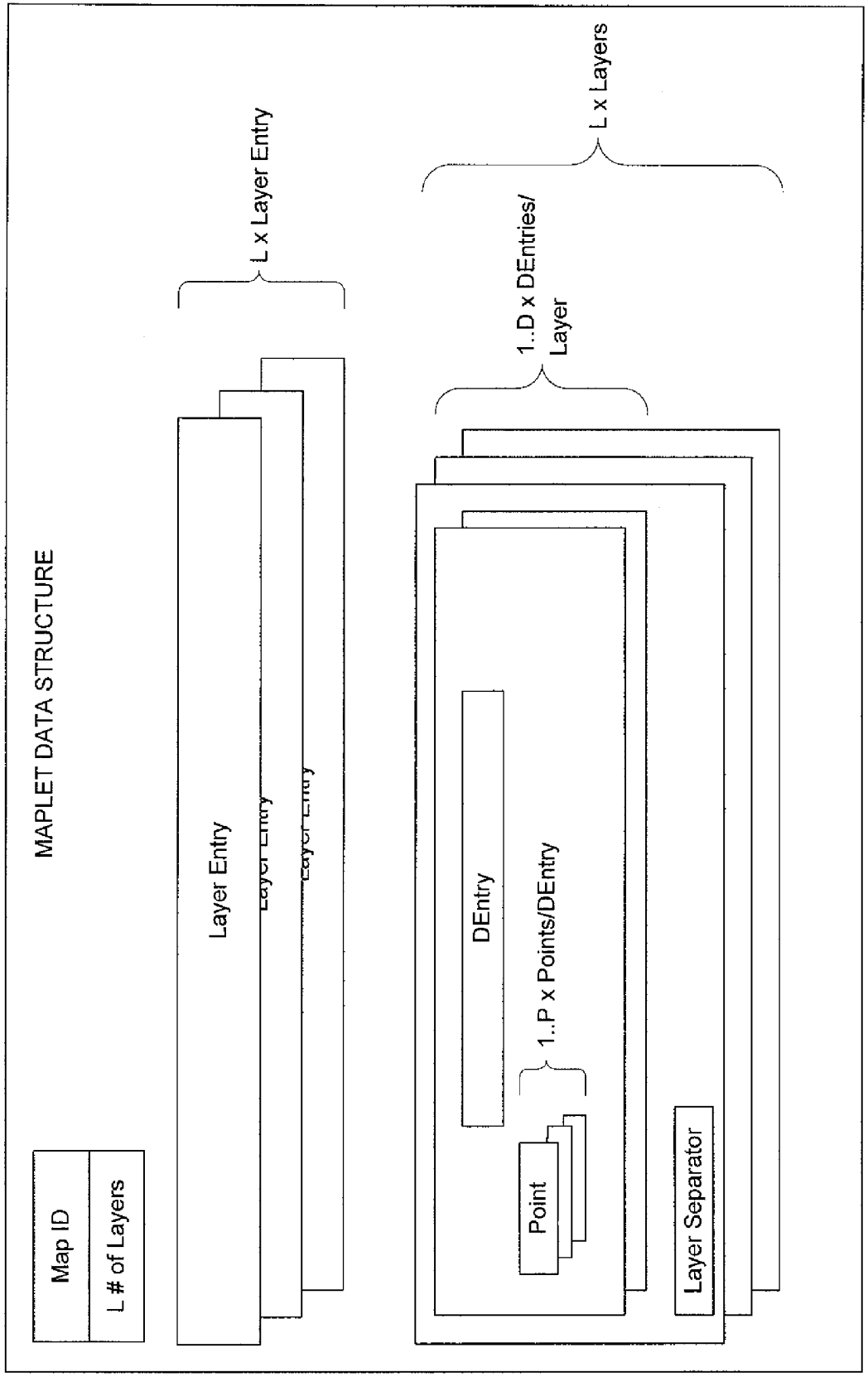
FIG. 3C is a diagram showing a preferred Maplet data structure as one example of a data structure that can be used for the present technology.

FIG. 3C and Table D (below), in combination, illustrate, by way of example only, a basic Maplet data structure. Generally, as noted above, the Maplet data structure can be said to include a Maplet Index (i.e. an index of the DEntries, each of which is representative of either an artifact or a label or both) together with data Points for each DEntry that actually form such artifacts and labels. In this example, each Maplet includes a Map ID (e.g. 0xA1B1C1D1), the # of Layers in the Maplet, and a Layer Entry for each Layer. The Map ID identifies the data as a valid Maplet, and according to one alternative, may also be used to identify a version number for the data. The # of Layers is an integer which indicates the number of Layers (and therefore Layer Entries) in the Maplet. Each Layer Entry defines rendering attributes and is followed by a list of DEntries for each Layer. The above forms a Maplet Index. For a complete Maplet, each DEntry contains a set of data Points (referred to herein as oPoints) or Labels). It will be noted that Layers can have multiple DEntries and the complete list of DEntries and Points are grouped by Layer and separated by a Layer Separator (e.g. hex value 0xEEEEFEE). In this example, each Layer Entry is 20 bytes long, and a DEntry is 12 bytes long. However, the number of Layers, number of DEntries per Layer and the number of Points per DEntry depends on the map data and is generally variable.

Table D provides a high "byte-level" description of a Maplet for this example.

TABLE D

| Data | | Quantity | Total # of Bytes |
|---|---|---|---|
| Map ID | | 1 | 4 bytes |
| # of Layers | | 1 | 4 bytes |
| Layer Entries | | # of Layers | 20 bytes × (# of Layers) |
| DEntry of a Layer | ×(# of DEntries) | # of Layers | 12 bytes × (Σ of the # of DEntries in each Layer) + |
| Points for DEntry of a Layer | in a Layer) | | Layer) + 4 bytes × (Σ of the # of Points in each DEntry in each Layer) + |
| Layer Separator | | | 4 bytes × (# of Layers) |

Figure 4:
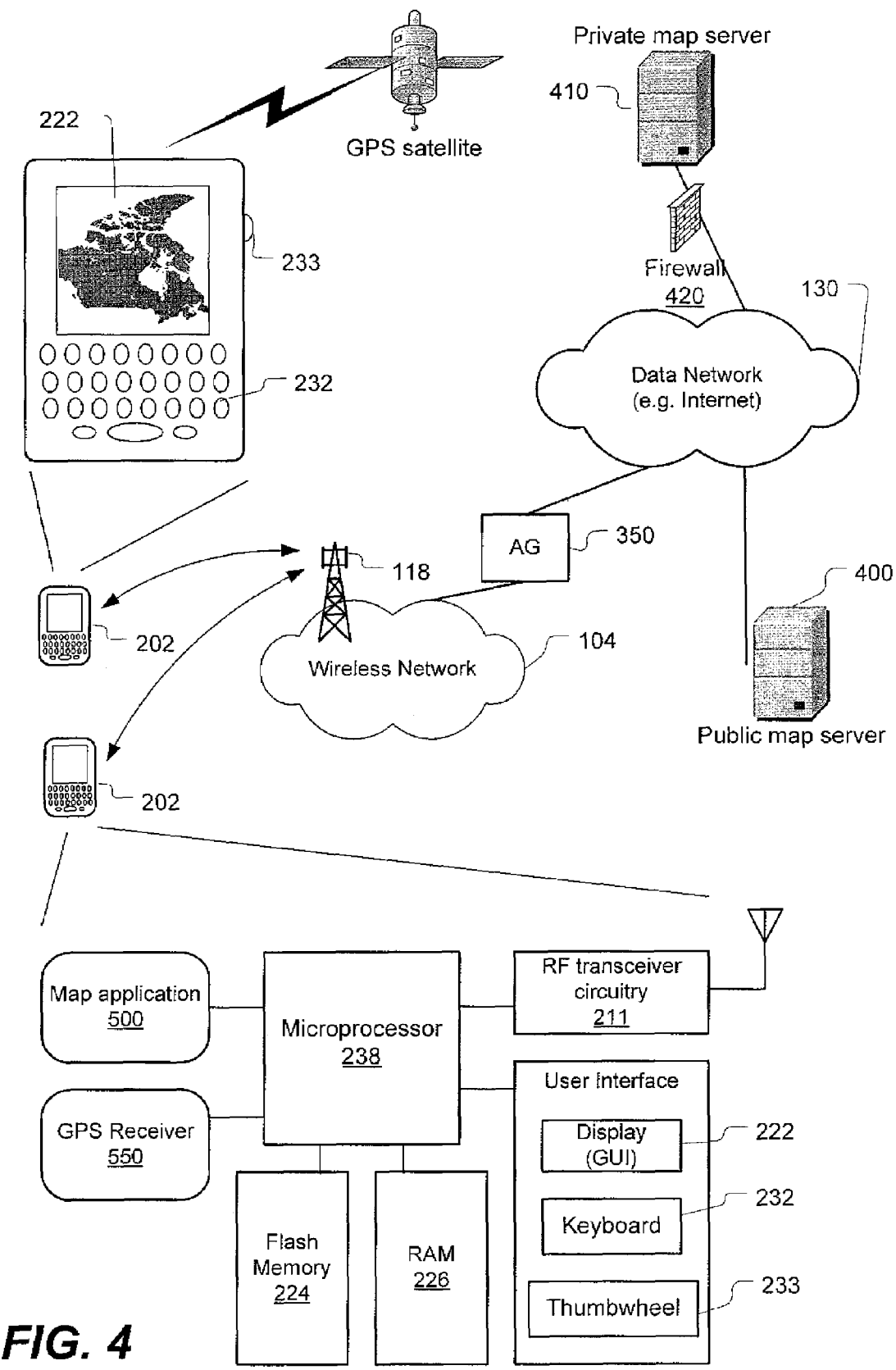
FIG. 4 is a schematic depiction of another example of a wireless network having an applications gateway for optimizing the downloading of map data from map servers to wireless communications devices.

By way of a further example, the wireless network 200 depicted in FIG. 4 can include an applications gateway (AG) 350 for optimizing data flow for onboard applications such as a mapping application 500 stored in memory (e.g. stored in a flash memory 224) and executable by the microprocessor 238 of the wireless device 202.

As shown in FIG. 4, the wireless network 200 hosts a plurality of handheld wireless communications devices 202 (such as the BlackBerry® by Research in Motion Limited) having voice and data capabilities (for both e-mail and Web browsing) as well as a full QWERTY keyboard. These wireless communications devices 202 can access Web-based map data on public map servers 400 hosted on the Internet or other data network 130 via the applications gateway (AG) 350 which mediates and optimizes data flow between the wireless network 200 and the data network by performing various encodings, mappings, compressions and optimizations on the data. The wireless communications device 202 can thus provide route information to a user of the device. In accordance with implementations of the presently disclosed technology, the wireless communications device 202 includes a radiofrequency transceiver (e.g. the RF transceiver circuitry 211 shown in FIG. 2) for receiving a destination location, a GPS chipset (e.g. GPS receiver 550 shown in FIG. 4) for determining a current location of the device 202 (or other positioning subsystem), a processor (e.g. microprocessor 238 shown in FIG. 2) operatively coupled to memory (e.g. Flash Memory 224 and RAM 226 shown in FIG. 2) for instructing the transceiver to communicate location data for the current location and the destination location to a route information server (e.g. Map servers 321, 325 shown in FIG. 3A or route information servers 400, 410 shown in FIG. 4) for downloading route information for a route from the current location of the device to the destination location, and a user interface (e.g. display (GUI) 222) for providing the route information to the user.

The map server extracts generic map content from a Geographical Information Systems (GIS) map database (e.g. Navtech®, TelAtlas®, etc.) at a specified level of resolution ("zoom level"). Custom graphics associated with the query, such as highlighted route, pushpin for current position or street address, etc. are post-processed and merged by the server with the generic map content. Relevant screen graphics are then labelled and the merged map graphic is compressed and delivered to the device for display. Alternatively, labelling can be done client-side using a computationally efficient labelling algorithm.

In operation, a user of the wireless communications device 202 uses an input device such as keyboard 232 and/or thumbwheel/trackball 233 to cause the microprocessor 238 to open the map application 500 stored in the memory 224. Alternatively, the map application can be launched by another application, such as a location-based services (LBS) application. The input device could also be integrated into the LCD display screen in the form a touchscreen device. Using the keyboard 232 and thumbwheel/trackball 233, the user can specify a map location on the map application 500. In response to this request/command, the microprocessor 238 instructs the RF transceiver circuitry 211 to transmit the request over the air through the wireless network 104. The request is processed by the AG 350 and forwarded into the data network (Internet) using standard packet-forwarding protocols to one or more of the public and/or private map servers 400, 410. Accessing a private map server 410 behind a corporate firewall 420 was described above with reference to FIG. 3A. Map data downloaded from these one or more map servers 400, 410 is then forwarded in data packets through the data network and encoded/transformed/optimized by the AG 350 for wireless transmission through the wireless network 104 to the wireless communications device 202 that originally sent the request.

The downloaded map data (including any available label data) can be cached locally in RAM 226, and displayed on the display 222 or graphical user interface (GUI) of the device. If a further request is made by the user (or if the user wants a change in the field of view by zooming or panning), the device will check whether the data required can be obtained from the local cache (RAM 226). If not, the device issues a new request to the one or more map servers 400, 410 in the same manner as described above.

As described earlier, map data can optionally be downloaded first as a Maplet Index enabling the user to then choose which DEntries listed in the Index to download in full (or alternatively which specific layers to download). Furthermore, as described earlier, the map application can include user-configurable context filtering that enables the user to filter out unwanted map features or artifacts by not downloading specific DEntries corresponding to those unwanted map features or artifacts.

In order to dynamically download map data in accordance with main implementations of the presently disclosed technology, the wireless communications device need not include a Global Positioning System (GPS) receiver ("GPS chip") 550. However, the inclusion of a GPS chipset receiver in the wireless device enables further functionalities related to the present technology, such as the ability to readily determine the velocity of the device, which, in turn, can be used to dynamically control or adjust the amount of map data being downloading and/or the nature of the map data being downloaded. Although GPS is the best way presently known for obtaining a velocity reading for a wireless device, a different type of positioning subsystem can be used, e.g. a radiolocation subsystem that determines its current location using radiolocation techniques, as will be elaborated below. In the main implementation, though, the GPS chipset 550 receives and processes signals from GPS satellites to generate latitude and longitude coordinates, thus making the device "location aware". In lieu of, or in addition to, UPS coordinates, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell.

Figure 5A:
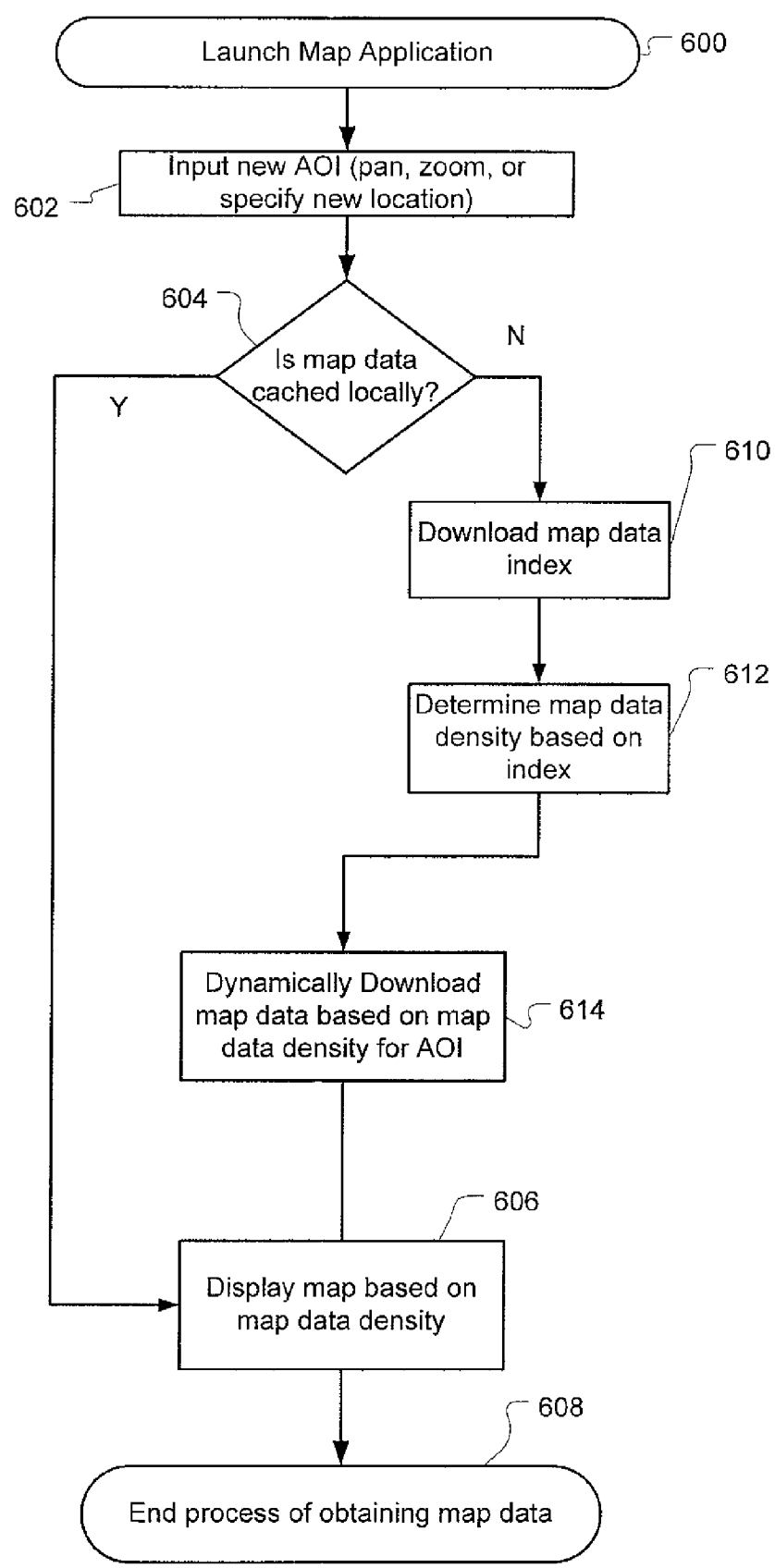
FIG. 5A is a flowchart presenting main steps of a method of dynamically downloading and displaying map data based on map data density in accordance with implementations of the present technology.

Operation of the dynamic download and display technology described above will now be described with reference to the method steps depicted in the flowchart of FIG. 5A. As depicted in FIG. 5A, this novel method of dynamically downloading map data to a wireless communications device includes an initial step 600 of launching a map application. This can be done directly by the user of the device, or indirectly by means of another application, e.g. an LBS application that causes the map application to open. At step 602, a user of the device inputs a new area of interest (AOI) by, for example, panning or zooming or specifying a location by address, city or geographical entity, point of interest (POI), or coordinates of longitude and latitude, etc. By selecting an AOI, the user causes the map application to obtain map data. Obtaining map data can be done by retrieving or downloading the data from a map server over the air (or via a wired connection) or by obtaining the map data, if cached locally, from onboard device memory. Thus, as decision step 604, a decision is made whether the map data is already cached locally. If so, then the map is then displayed (rendered onscreen) at step 606. Displaying of the map at step 606 can also be done dynamically, i.e. irrespective of the dynamic downloading of the map content. In other words, the device can dynamically display (or dynamically render) the map based on map data density. For example, dynamic displaying/dynamic rendering can be used to ensure that certain map features are rendered preferentially. Operations would then end at step 608 (until a new input is received by the map application requiring potentially new map data). On the other hand, if all of the map data required for the AOT is not cached, then following the decision step 604, operations proceed to step 610 where the device downloads the map data index for the AOI. At step 612, the map data density is determined based on the map data index (as will be elaborated below in greater detail). One example of a map index is the Maplet index introduced above. In the case of Maplets, there are potentially more than more. Maplet for a given AOI. Accordingly, the map data density can be computed from the Maplet index for each one or more Maplets that is (or are) part of the AOI. At step 614, the map data is then downloaded dynamically based on the determined map data density. In other words, as will be explained below, if the map data density is low (typically the case for a rural area), then additional map data will be retrieved to add further map features to the map so as to improve the overall map detail. Thereafter, at step 606, the map data is displayed. Optionally, the map data is dynamically displayed Operations then cease at step 608 (until a further input is received requiring reiteration of this process). To partially recap, therefore, the map data can be not only dynamically downloaded based on map data density but also optionally dynamically displayed based on map data density. While this flowchart depicts steps of adding detail for a low-density AOI, an analogous technique can be used to avoid downloading and/or displaying extra data where the map data density is too high.

Figure 5B:
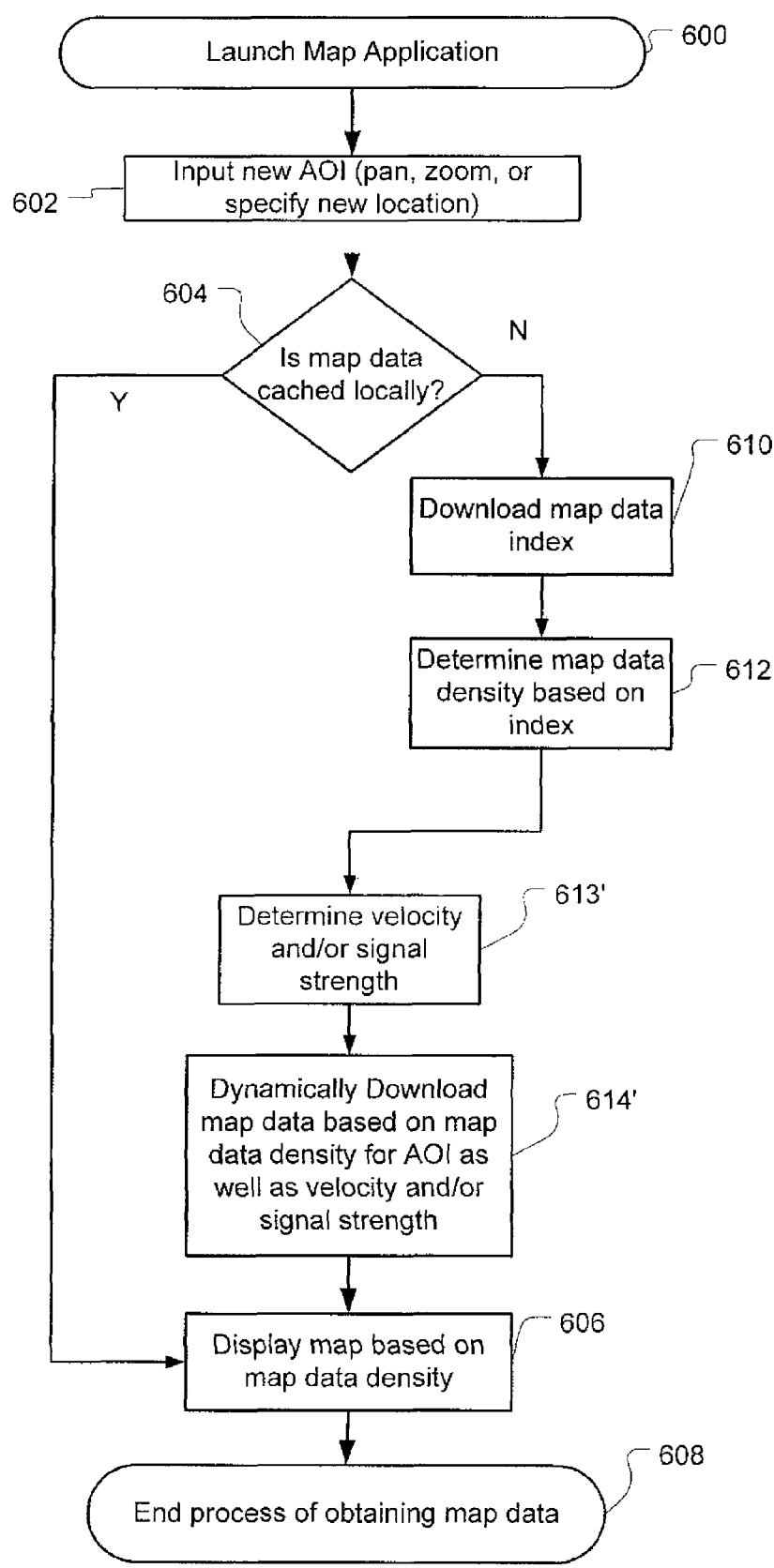
FIG. 5B is another flowchart depicting a modified method of dynamically downloading map data in which velocity and/or signal strength is also used to modulate the map data being downloaded.

FIG. 5B is another flowchart, similar to the one presented in FIG. 5A, but showing a more refined method wherein velocity and/or signal strength are used to modulate the map data being downloaded. In other words, at step 613, velocity and/or signal strength is determined. At step 614', the map data is dynamically downloaded and/or displayed based on one or both of the velocity of the device and the signal strength. This can be enabled by embedding a GPS receiver in the wireless communications device. The GPS receiver determines a velocity of the wireless communications device, using known techniques. The processor of the device then instructs the radiofrequency transceiver to dynamically download the map data for the area of interest based on the velocity of the device. In another implementation, the radiofrequency transceiver of the wireless communications device is further configured to determine a signal strength of a wireless link of the wireless communications device, so that the processor can then instruct the transceiver to dynamically download the map data based on the signal strength. In another implementation, map data can be dynamically downloaded based on battery status, i.e. the remaining battery power. If remaining battery power is low, then only the most critical map data is downloaded, with extraneous details being sacrificed in order to preserve the limited reserves of the battery.

Figures 6A, 6B, 6C, 6D, 6E, 6F, 6G, 6H:
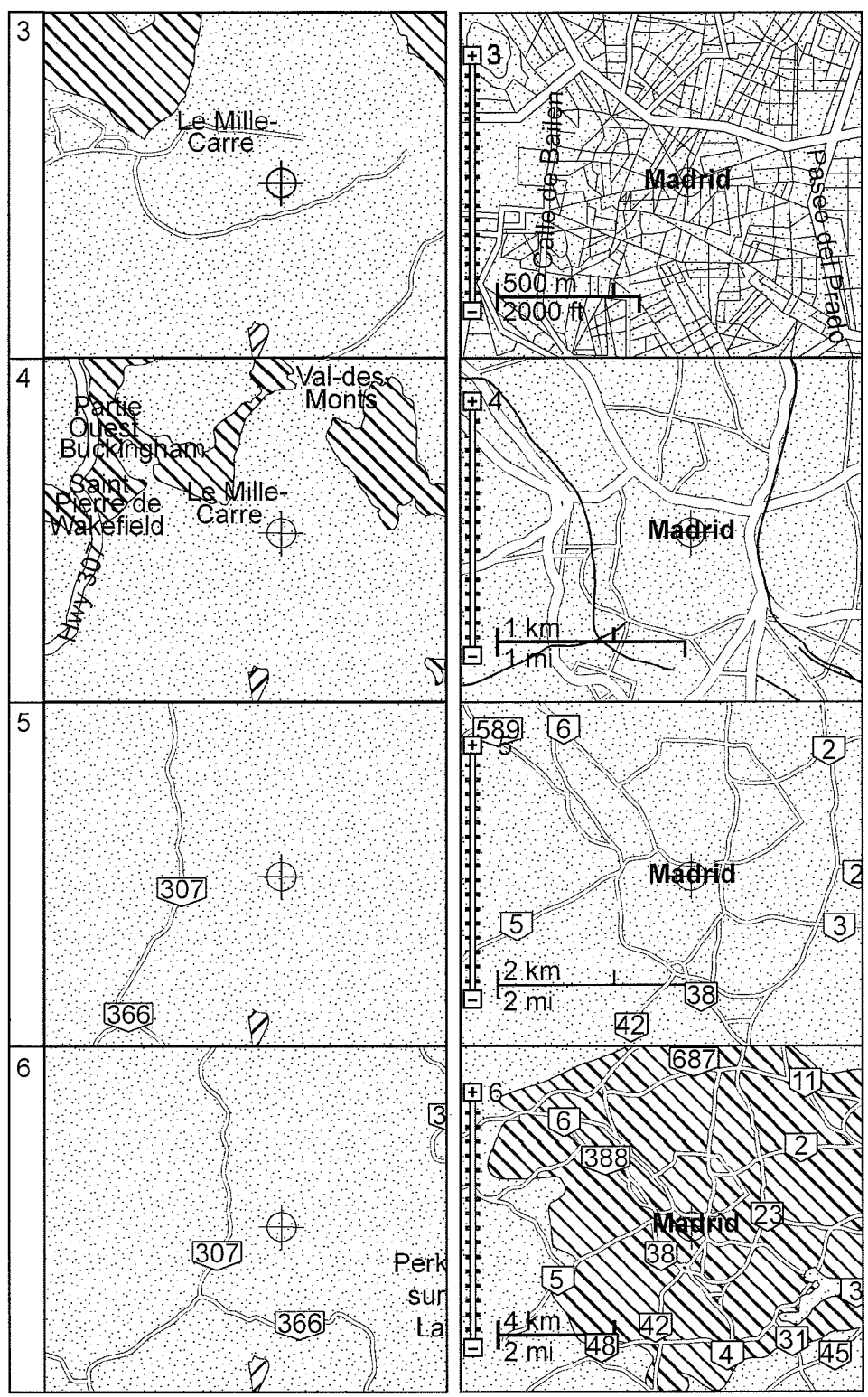
FIG. 6A is a screenshot of a rural area at Zoom Level 3.
FIG. 6B is a screenshot of a dense urban area at Zoom Level 3.
FIG. 6C is a screenshot of a rural area at Zoom Level 4.
FIG. 6D is a screenshot of a dense urban area at Zoom Level 4.
FIG. 6E is a screenshot of a rural area at Zoom Level 5.
FIG. 6F is a screenshot of a dense urban area at Zoom Level 5.
FIG. 6G is a screenshot of a rural area at Zoom Level 6.
FIG. 6H is a screenshot of a dense urban area at Zoom Level 6.

Returning now to FIG. 6A-6H, these are screenshots of typical situations encountered using conventional technology. In FIG. 6A, the map at Zoom Level 3 of a rural area shows lakes and rural roads whereas Zoom Level 3 of a big city like Madrid (FIG. 6B) shows full detail including most of the main streets and boulevards. The map detail of the rural map (FIG. 6A) is effectively limited by what would be considered acceptable for the urban map (FIG. 6B). As the Zoom Level is increased to 4, as shown in FIGS. 6C and 6D, the rural map begins to lose relevant detail such as the side streets. The urban map (FIG. 6D) still shows highways and main streets. At Zoom Level 5, the lakes are lost in the rural map (FIG. 6E) while the Madrid map (FIG. 6F) still shows highways surrounding and crisscrossing the city. At Zoom Level 6, the rural map has completely lost most of the relevant detail except for two highways (Highways 307 and 366) whereas the map of Madrid still shows main highways around the city. The problems illustrated in the foregoing can be redressed by applying the present technology so as to dynamically download map data based on the map data density for a given area of interest. In other words, "additional" or "extra" map data can be downloaded for a given AOI to provide greater map detail beyond what would ordinarily be provided at the selected zoom level. What is "ordinarily provided" is a function of the given zoom level. For example, a layer of map data pertaining to water features (lakes and rivers) is ordinarily not provided at Zoom Level 3. However, for a rural map with low density, the present technology would potentially add water features (lakes and rivers) as extra detail to the map even though the map data associated with that layer is typically suppressed or not retrieved at that zoom level. Therefore, additional features and map detail can be downloaded and displayed so as to provide a more useful map to the end-user.

This dynamic downloading technique (with the option of further dynamically displaying the map data) can also be used to remove data based on an excessively high map data density. For example, if a given zoom level, e.g. Zoom Level 4, all side streets are normally downloaded and displayed, this technique can be used to determine whether the map data density for a given urban area, e.g. downtown Madrid, is too high (exceeds a predetermined threshold). In that case, if the map data density is too high, the download and/or display of map data for that city would be dynamically adjusted to load and render less data than would normally be done.

Dynamic downloading can be done layer by layer or entry by entry. In the specific example of Maplets, given the special hierarchical nature of the Maplet data structure described previously, it is possible to download individual map data entries from a given map data layer rather than having to download the entire layer of entries. This provides great flexibility in modulating the level of detail for a given map. As will be appreciated, specific implementations of this technology can be developed to preferentially download specific entries from a given layer based on a priority list. For example, one could download a specific street (a polyline entry from a street layer) and its label without downloading and/or displaying all the other streets of that same layer.

In an exemplary implementation of the present technology, the dynamic downloading of map data is done in the following manner:

(1) First, retrieve one or more map indexes (index for each new Maplet) for the desired area if it not cached on the device already. Note that in the example described above the map index is easily one-tenth of the size of the map data itself or even potentially smaller so this index can be retrieved much more quickly than the map data itself.

(2) Based on the map data index, which contains a list of every layer of map data available as well as all the pieces of the map (or "map elements"), calculate the size of the desired pieces and layers. Since the index provides an offset to each of the pieces of data and this offset represents a 1:1 correspondence with size, the size of each piece or layer can be easily calculated. Preferably, only the layers which may or may not be displayed at the current zoom level need to be checked. So for example, at zoom level 4 or 5 (or above) major and secondary streets are always displayed no matter what the density is because there is nowhere in the world where the density is high enough at zoom level 4 or 5 to have to make a decision whether it would be crowded onscreen. Therefore, these layers do not need to be checked. However, side streets should be checked since in rural areas the number of side streets can be small. As well, the water layer should be checked since small lakes and rivers are not usually displayed above zoom level 3.

(3) If the data being checked, i.e. the data that is normally not displayed, has a density below a predetermined threshold, then the data should be retrieved and displayed; otherwise, it should not be displayed or retrieved because it would clutter up the map or make the total data load too large to efficiently download. Alternatively, as mentioned above, the dynamic download and display algorithm can also be used to determine if the map data density (layer or element size) exceeds a predetermined threshold for a layer that is ordinarily downloaded and displayed. If the map data density is excessively high, i.e. exceed the threshold, then all or portions of that layer would not be downloaded and/or displayed.

As noted above, this algorithm can be modified to further take into account the velocity of the device (as preferably (but not necessarily) determined using GPS). If the velocity of the device is high, e.g. traveling at 100 km/h, then the total data being downloaded for the AOI as the map view continually refreshes may be excessive if extra layers or map features are to be retrieved in additional to the normally retrieved layers. Thus, the velocity may be used to modulate or vary the actual amount of data being downloaded (how many data points) and/or the layers that are to be retrieved.

In another implementation of this technology, the total map data density or map data size for all available map data for a given AOI can be used to dynamically download (and optionally also dynamically display) the map data without presuming that any layers of the data are to be automatically downloaded (and displayed). In other words, rather than automatically downloading certain default layers and then assessing whether certain optional layers are to be downloaded, the technique can simply evaluate the total map data density for a given AOI, and then determine which layers (or even which specific map elements, i.e. individual entries in a layer) are to be downloaded.

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

Implementations of the present technology will now be further explained with regard to various examples presented in FIG. 7A to FIG. 10.

FIG. 7A shows an example of an intentionally simplified map index showing a variety of layers relating to parks, landmarks, bodies of water, labels, railroads, highways, main streets and side streets. This map index enables the device to compute the size of each layer as being representative of the map data density. If the size of a given layer (as a proxy for map data density) is too high or too low, the device will dynamically download and display less or more map data than it would ordinarily download and display. As shown in FIG. 7A, associated with each layer are "Zoom In" and "Zoom Out" parameters which govern the zoom levels at which various layers are normally retrieved and displayed. For example, the layer "Parks A" is normally downloaded and displayed between zoom levels 0 and 4, inclusive, whereas the layer "Parks B" is normally downloaded and displayed for zoom levels 5 to 8, inclusive, etc. Thus, for a given zoom level, the index indicates which layers are (normally) to be downloaded and displayed.

For example, with reference to FIG. 7A, consider the five separate layers of roadways, which include two layers of highways, two layers of main streets and one layer of side streets. Instead of automatically downloading all five layers of roadways (which is the default for zoom levels 0 to 3), the device would determine the size of the data for side streets at zoom level 3, 4 and 5 (even though side streets are normally not displayed at zoom levels 4 and 5 according to conventional mapping techniques). If the data size is large, e.g. as it would be for downtown Madrid, then the map data (layers) for zoom levels 3, 4, and 5 would not be retrieved, leaving only map data for zoom levels 1 and 2. If the data size is small (for example a rural area), then the map data (layers) for zoom levels 4 and 5 would be retrieved and displayed in addition to the map data for zoom level 3.

In one implementation of the technology, map data size can be conveniently calculated using the offsets which are stored in the map data index (see, by way of example, the address offsets and offsets shown in Tables B and C, above, for the specific example of Maplets). For a very simple illustrative example, consider a map index having five layers where the offset of layer 0=0, the offset of layer 1=100, the offset of layer 2=250, the offset of layer 3=275, and the offset of layer 4=575.

In this example, to calculate the size of Layer 0 simply subtract the offset of Layer 1 from the Offset of Layer 0=100−0=100. Therefore Layer 0 is 100 bytes. Layer 1 is 250−100=150 bytes, Layer 2 is 275−250=25 bytes, Layer 3 is 575−275=300 bytes and Layer 4 would be calculated by having the total size (not shown) and subtracting 575.

Once the map data density or size is determined, e.g. the layer sizes, then the device dynamically places a request for specific layers which are potentially optional for the specific zoom level. So, for example, at zoom level 3, street layer 5 (side streets) may be optional depending on whether it exceeds a maximum value (so it's normally displayed unless it exceeds a certain size (2 kilobytes, for example). Likewise at zoom level 4 the reverse could be true. Street level 5 streets are normally not retrieved or displayed but if the layer is below a certain size (say 200 bytes) then it is retrieved to provide more details. The device could make use of a look-up table which indicates which layers (statically) are retrieved at each zoom level. The table would also specify a set of optional layers which are either retrieved/displayed if they are below a certain size (first predetermined threshold) and certain optional layers which are not retrieved/displayed if the data size exceeds another (second) predetermined threshold.

Figure 7B:
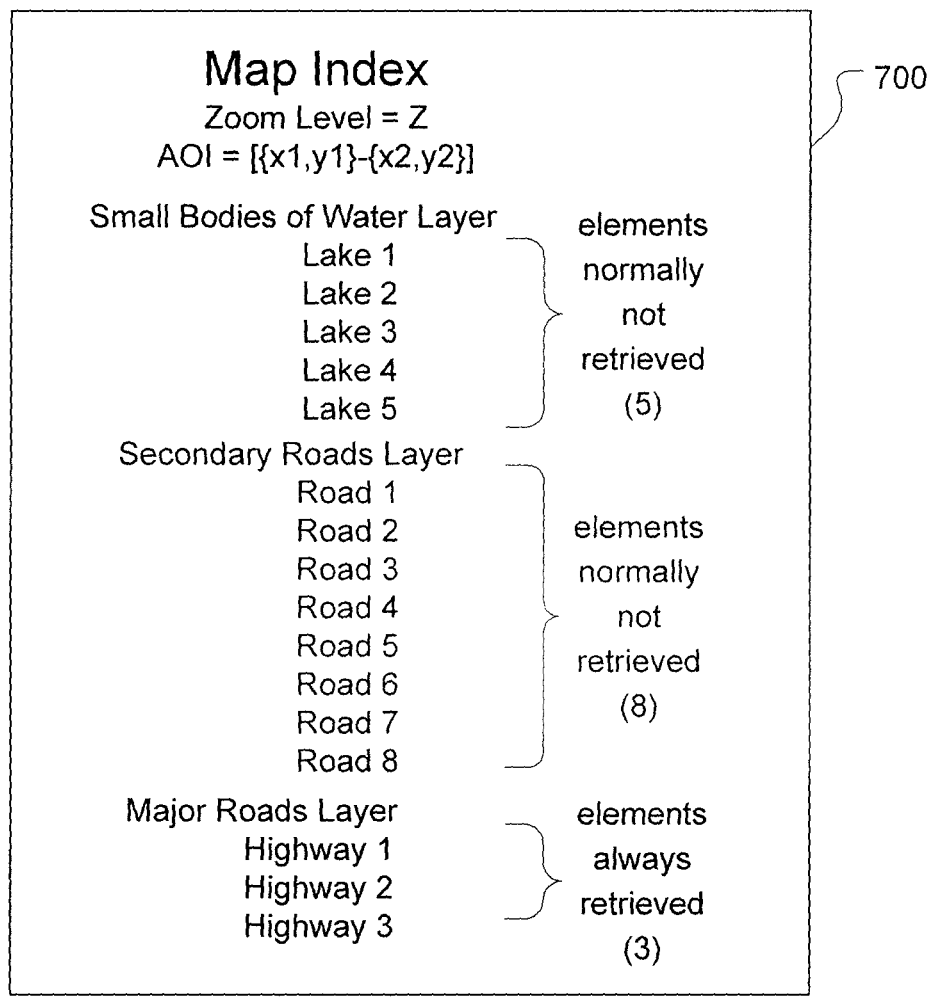
FIG. 7B schematically depicts an alternative example of a map index used for quickly estimating map data density for an area of interest.

FIG. 7B schematically depicts an example of a map index 700 used for quickly estimating map data density for an area of interest. This is merely a hypothetical example of a map index, and is not meant to actually represent a "real-life" situation. The map index downloaded to the device will be a function of the AOI (bounding box) and the zoom level. The zoom level Z can optionally be presented as part of the header of the map index along with (again optionally) an indication of the bounding box representing the AOI, as shown, although it should be clearly understood that the zoom level Z and bounding box need not be presented with or in the map index at all.

In the map index 700 shown by way of example in FIG. 7B, each available layer of map data is presented, not necessarily in the format shown, where each layer lists each piece or map element available for that AOI and zoom level. For example, a water layer may have five lakes (Lakes 1-5), a secondary road layer may have eight side roads (Roads 1-8). A major roads layer might list Highways 1-3. Again, these are merely presented by way of example, simply to illustrate how the algorithm works. Assuming now that, at the selected zoom level, only the major roads layer is automatically (normally) retrieved and displayed. Typically, at this zoom level, the water layer and secondary roads layers are not retrieved because to do so in an equivalent urban map scenario (for the same zoom level) would result in an overly crowded map.

However, using the present technology, if the AOI is a rural or low-density area, then a check is performed at that particular zoom level to determine whether the map data density of the AOI is sufficiently low to enable additional retrieval of map detail from the water layer and/or the secondary roads layer (or any other layer that is not ordinarily or automatically obtained using the general layer retrieval criteria).

The map data density for the AOI, in accordance with implementations of the present technology, is checked by computing or estimating the size of all the elements in the layers of the AOI. This can be done, following the algorithm described below, by adding up the total number of elements/parts in each layer.

In this case, there are 5 lakes and 8 secondary roads for a total of 13 elements that are normally not retrieved and displayed at that zoom level. Assume then that the map can accommodate 10 elements onscreen at that zoom level without causing crowding issues. (This number is strictly arbitrary to illustrate operation of this technique, and has no bearing on actual thresholds that may be used.) Since the major roads (the three highways) are automatically always retrieved and displayed, there is room for seven more elements that are normally not retrieved and displayed at that zoom level. In other words, the density (3) is less than the predetermined threshold (10), thereby providing room for more map detail on this rural (low-density) map.

Since the water layer has 5 available elements and the secondary roads layer has 8 available elements, not all elements of both of these layers can be added. This would exceed the maximum capacity (predetermined threshold). The device can optionally pick all its "extra elements" from one layer or it can pick elements equally from more than one layer. In the former case, it would have to pick the water layer since the 8 elements of the secondary roads layer would cause the total number of elements to exceed the threshold (and overcrowd the map).

Alternatively, the device could be configured to pick all elements from one layer and then pick as many other elements from other layers as possible until the threshold is reached, e.g. in this case, pick the two elements from the secondary roads layer in order to maximally use up all the available space on the map. Where more than one other layer is available, the device could pick an equal amount of elements from all other available layers or it could favour one type of layer over the other. As can be appreciated, various algorithms can be designed to pick the extra elements to be added to the map.

Optionally, the user can configure the device to pick subjectively high-priority elements, i.e. the map application can be configured by the user to favour one type of element (e.g. the user may prefer secondary roads over water or vice versa).

In the foregoing, however, it bears emphasizing that the determination of map data density can be done by computing the map data size (using offsets), by summing the number of elements, a combination of both, or by another technique altogether that otherwise quantifies or estimates the map data density. The map data density, however it is calculated or estimated, is then used to determine if the map data for a given area of interest is too high or too low. In other words, the map data density can be compared against either one or two predetermined thresholds, a first threshold for determining if the map data density is too high and a second threshold for determining if the map data density is too low. Depending on the map data density, the map data is then downloaded dynamically and also optionally displayed dynamically in order to render onscreen a map with the appropriate level of detail, irrespective whether the area of interest is urban, suburban or rural. If the map data density is too low, then map data is obtained for each layer where the map density is below the threshold (i.e. by downloading map data from the next available layer). Conversely, if the map data density is too high, i.e. above a predetermined threshold, then map data is obtained only for layers where the map density is below the threshold.

In one implementation, where the GPS chipset is providing real-time navigation data to a navigation application, e.g. a turn-by-turn navigation application, then the device might automatically favour streets over geographical features like lakes since it is arguably more important for the user to be kept apprised of all secondary streets or side streets in the immediate vicinity of the user's path of travel or programmed route.

Figure 8:
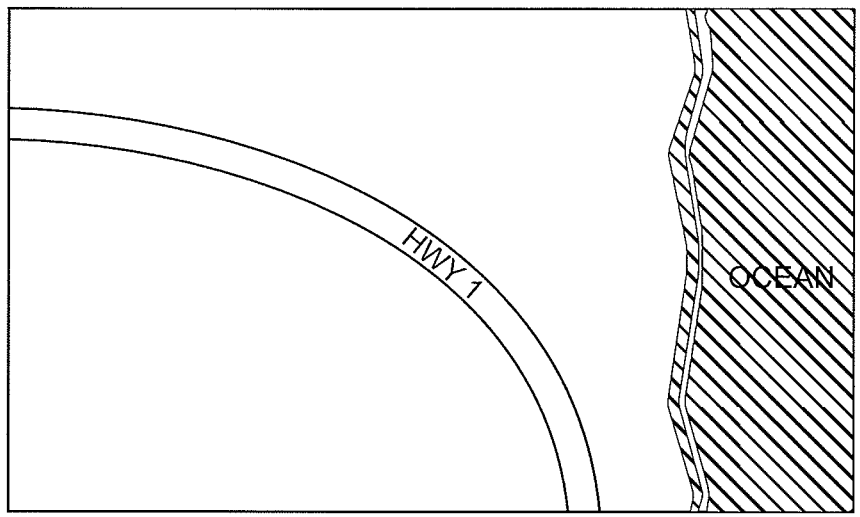
FIG. 8 schematically depicts a low-density map to which additional map detail can be added using the present technology.

FIG. 8 schematically depicts a low-density map to which additional map detail can be added using the present technology. On this low-density (e.g. rural) map, only the ocean layer and major roads layer are normally displayed for the selected zoom level. Lesser layers (e.g. the minor roads layer and the small lakes layer) containing more detailed features are typically not retrieved and displayed because these would overcrowd the map if a comparable map (same zoom level) were downloaded in a denser (e.g. urban) area, using the conventional approach. However, applying the new technology described herein, an assessment is made as to whether any of the map layers that are typically not retrieved and displayed could in fact be retrieved and downloaded without overcrowding the given map. This is done, as explained above, by computing or estimating (i.e. determining) the map data density. For example, this computation could be done based on the map data index for the AOI at that given zoom level. In this example, let us assume that the map data density is lower than the predetermined threshold and thus it is possible (and even desirable) to retrieve additional (extra) map data to provide further map detail on the map.

Figure 9:
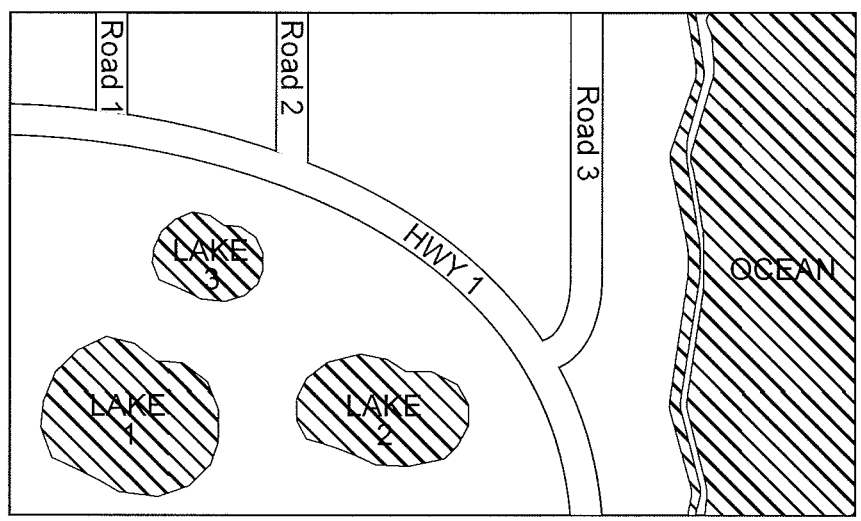
FIG. 9 schematically depicts the addition of map detail to the low-density map of FIG. 9A by retrieving map layers that are not normally displayed at that zoom level.

FIG. 9 schematically depicts the addition of map detail to the low-density map of FIG. 9A by retrieving map layers that are not normally displayed at that zoom level. In this example, three lakes belonging to the small lakes layer and three side roads belonging to the minor roads layer (which would normally not be retrieved) are in this instance retrieved and displayed so as to provide a greater level of detail on the map for the AOI selected. Since the map data density is checked for each AOI, the actual layers of map data being downloaded will vary dynamically. Alternatively, as mentioned above, it is possible to effectively remove or suppress map detail from what would ordinarily be a high-density map by not downloading or displaying all the map detail that ordinarily would be displayed for a given zoom level. This can be done by dynamically reducing the map data that is downloaded based on the map data density and/or by dynamically reducing the map data that is rendered onscreen, again based on the map data density.

Figure 10:
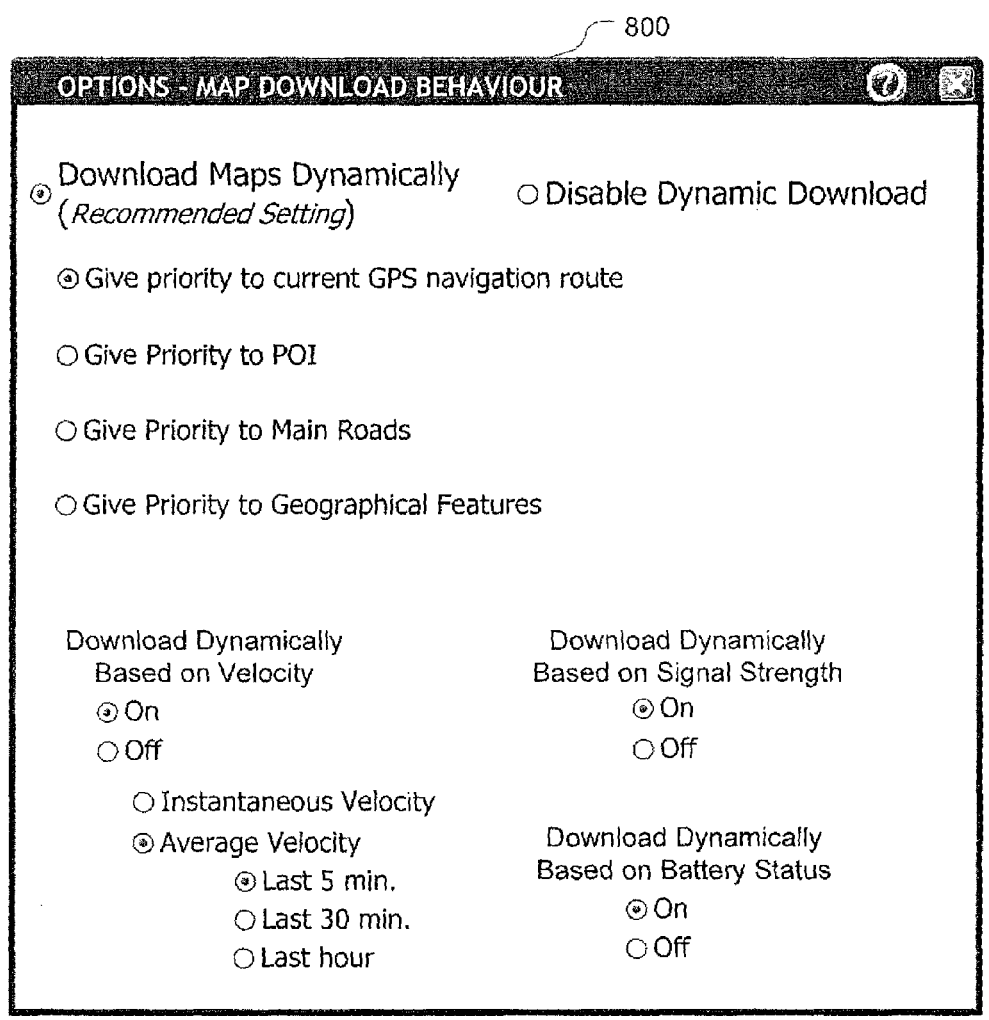
FIG. 10 schematically depicts an options page for enabling a user of the device to configure settings and preferences governing the manner in which the device downloads maps.

FIG. 10 schematically depicts an example of an options page 800 for enabling a user of the device to configure settings and preferences governing the manner in which the device downloads maps. Because of the overall improvement in map quality and map detail, the recommended setting is of course to enable the new dynamic downloading technology. However, there may be instances where the user wishes to stop dynamic downloading (i.e. to conserve processing resources, over-the-air bandwidth or to conserve battery, for example.) The options page could have choices to give priority to various types of data layers, such as main roads, point of interest (POT) or geographical features. As mentioned above, if the map is being used for GPS-enabled navigation, then priority can be given to routing or displaying of side roads, POT or other any feature that is relevant to navigation along the route programmed or the current path of travel.

The options page 800 could also, again by way of example only, provide settings for the user to modulate the dynamic downloading of map data based on velocity (either instantaneous or average), based on signal strength or based on remaining battery power. The options page 800 could also, again by way of example, provide a setting or toggle to enable or disable the dynamic displaying option (or dynamic rendering option), thus permitting the user to select whether data is to be further dynamically displayed, e.g. based on map density, a priority scheme, or other such criteria. These are merely a few examples of configurable features that the map application could provide to the user.

Although implementations of the foregoing technology have been described in terms of dynamically downloading (and optionally also dynamically displaying) map data structured in vector format, this novel technology can also be applied to map data delivered to the device in bitmap format. In one such implementation, the map data density can be calculated by the map server itself (or by another server connected thereto), rather than by the device. Based on the density of map data for a given request, the server then decides which data to transmit to the device. The data transmitted to the device could be either in bitmap format or in vector format.

This new technology has been described in terms of specific implementations and configurations (and variants thereof) which are intended to be exemplary only. The scope of the exclusive right sought by the applicant is therefore intended to be limited solely by the appended claims.

The invention claimed is:
1. A method of dynamically downloading map data to a wireless communications device, the method comprising:
  determining, at the wireless communications device, a map data density for an area of interest by:

obtaining one or more map data indexes for map data corresponding to the area of interest, the map data indexes indicating all available map data for the area of interest; and computing, at the wireless communications device, the map data density for the area of interest based on the one or more map data indexes, the computing determining a total number of elements within the area of interest; and dynamically downloading the map data for the area of interest based on the map data density by:

identifying default layers of map data for a zoom level;

downloading the default layers and at least one additional map layer if the map data density is below a first predetermined threshold number of elements to ensure a number of elements within the map data is above the first predetermined threshold number of elements; and downloading fewer than all of the default layers if the map data density is above a second predetermined threshold number of elements to ensure the number of elements within the map data to be below the second predetermined threshold number of elements.

2. The method as claimed in claim 1 further comprising dynamically displaying a map rendered from the map data downloaded for the area of interest, the map being dynamically displayed based on the map data density.

3. The method as claimed in claim 1 wherein computing map data density comprises:

computing the total number of map elements from the map index as being generally representative of the map density for the area of interest; and determining whether the map density is below the first predetermined threshold number of elements.

4. The method as claimed in claim 3 further comprising selecting which map layers to download based on the map data density for selected map layers.

5. The method as claimed in claim 4 wherein the map data is downloaded for the selected map layers for which the map data density is below the first predetermined threshold number of elements.

6. The method as claimed in claim 1 wherein computing map data density comprises:

computing the total number of map elements from the map index as being generally representative of the map density for the area of interest; and determining whether the map density is above the second predetermined threshold number of elements.

7. The method as claimed in claim 6 further comprising selecting which map layers to download based on the map data density for selected map layers.

8. The method as claimed in claim 7 wherein the map data is downloaded for the selected map layers for which the map data density is below the second predetermined threshold number of elements.

9. The method as claimed in claim 1 further comprising determining a velocity of the wireless communications device using a GPS receiver whereby the map data is also dynamically downloaded based on the velocity.

10. The method as claimed in claim 1 further comprising determining a signal strength of a wireless link of the wireless communications device whereby the map data is also dynamically downloaded based on the signal strength.

11. The method as claimed in claim 1 further comprising determining a remaining battery power of the wireless communications device whereby the map data is also dynamically downloaded based on the remaining battery power.

12. The method as claimed in claim 1 wherein dynamically downloading the map data comprises downloading individual map data entries in a layer of map data.

13. A computer-readable medium comprising code which, when loaded into memory and executed on a processor of a wireless communications device, is adapted to perform acts of:

determining, at the wireless communications device, a map data density for an area of interest by obtaining one or more map data indexes for map data corresponding to the area of interest, the map data indexes indicating all available map data for the area of interest; and computing, at the wireless communications device, the map data density for the area of interest based on the one or more map data indexes, the computing determining a total number of elements within the area of interest; and dynamically downloading the map data for the area of interest based on the map data density by:

identifying default layers of map data for a zoom level;

downloading the default layers and at least one additional map layer if the map data density is below a first predetermined threshold number of elements to ensure a number of elements within the map data is above the first predetermined threshold number of elements; and downloading fewer than all of the default layers if the map data density is above a second predetermined threshold number of elements to ensure the number of elements within the map data to be below the second predetermined threshold number of elements.

14. The computer-readable medium as claimed in claim 13 wherein the code is further adapted to dynamically display a map rendered from the map data downloaded for the area of interest, the map being rendered dynamically based on the map data density.

15. The computer-readable medium as claimed in claim 13 wherein computing the map data density comprises:

computing the total number of map elements from the map index as being generally representative of the map density for the area of interest; and determining whether the map density is below the first predetermined threshold number of elements.

16. The computer-readable medium as claimed in claim 13 wherein computing the map data density comprises:

computing the total number of map elements from the map index as being generally representative of the map density for the area of interest; and determining whether the map density is above the second predetermined threshold number of elements.

17. A wireless communications device comprising:

a radiofrequency transceiver for requesting and receiving map data corresponding to an area of interest wherein the radiofrequency transmitter downloads one or more map data indexes to enable the processor to determine the map data density, the map data indexes indicating all available map data for the area of interest;

a processor operatively coupled to memory for determining a map data density based on a total number of map elements listed in the one or more map data indexes for the area of interest and for dynamically downloading map data based on the map data density for the area of interest by identifying default layers of map data for a zoom level, downloading the default layers and at least one additional map layer if the map data density is below a first predetermined threshold number of elements to ensure a number of elements within the map data is above the first predetermined threshold number of elements and downloading fewer than all of the default layers if the map data density is above a second predetermined threshold number of elements to ensure the number of elements within the map data to be below the second predetermined threshold number of elements; and a display for displaying a map based on the map data downloaded for the area of interest.

18. The wireless communications device as claimed in claim 17 wherein the processor instructs the display to dynamically display the map based on the map data density.

19. The wireless communications device as claimed in claim 17 wherein the processor instructs the radiofrequency transmitter to download extra layers of map data if the map data density is below the first predetermined threshold number of elements.

20. The wireless communications device as claimed in claim 17 wherein the processor instructs the radiofrequency transmitter to download only the layers of map data where the map data density is below the first predetermined threshold number of elements.

21. The wireless communications device as claimed in claim 17 further comprising a GPS receiver for determining a velocity of the wireless communications device, the processor dynamically downloading the map data for the area of interest based also on the velocity of the device.

22. The wireless communications device as claimed in claim 17 wherein the radiofrequency transceiver is further configured to determine a signal strength of a wireless link of the wireless communications device, the processor dynamically downloading the map data based also on the signal strength.

23. The wireless communications device as claimed in claim 17 wherein the processor is further configured to determine remaining battery power of a battery powering the wireless communications device, the processor dynamically downloading the map data based also on the remaining battery power.

24. The wireless communications device as claimed in claim 17 wherein the radiofrequency transceiver downloads individual map data entries from within a map data layer.

\* \* \* \* \*